United States Patent
Keum et al.

(10) Patent No.: US 9,661,255 B2
(45) Date of Patent: May 23, 2017

(54) DISPLAY APPARATUS AND CONTROL SYSTEM AND METHOD FOR SAME

(71) Applicant: SAMSUNG ELECTRONICS CO., LTD., Suwon-si, Gyeonggi-do (KR)

(72) Inventors: Kun-Ho Keum, Suwon-si (KR); Min Sup Kim, Suwon-si (KR); Myoung Jun Lee, Suwon-si (KR); Jong Keun Lee, Seoul (KR); Kyu Jung Jo, Suwon-si (KR); Kwan Young Kim, Suwon-si (KR); Hyun-Kyu Yun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 82 days.

(21) Appl. No.: 14/863,521

(22) Filed: Sep. 24, 2015

(65) Prior Publication Data
US 2016/0100120 A1 Apr. 7, 2016

(30) Foreign Application Priority Data

Oct. 1, 2014 (KR) ......................... 10-2014-0132521

(51) Int. Cl.
*G05B 19/00* (2006.01)
*H04N 7/16* (2011.01)
(Continued)

(52) U.S. Cl.
CPC ........... *H04N 5/4403* (2013.01); *G08C 17/02* (2013.01); *H04N 21/4108* (2013.01);
(Continued)

(58) Field of Classification Search
CPC .......... G05B 19/00; H04N 7/16; H04N 21/41; H04N 21/436; H04N 5/44; H04L 12/28; H04W 4/00
(Continued)

(56) References Cited

U.S. PATENT DOCUMENTS 8,545,331 B2 * 10/2013 Reams ............... H04N 5/44513
463/42
8,947,199 B2 * 2/2015 Lucaci .................. H04L 12/282
340/12.22
(Continued)

FOREIGN PATENT DOCUMENTS

EP 1 443 736 8/2004
KR 10-2011-0064532 6/2011
(Continued)

OTHER PUBLICATIONS

Search Report mailed Mar. 18, 2016 in counterpart International Application No. PCT/KR2015/009528.
(Continued)

*Primary Examiner* — Nam V Nguyen
(74) *Attorney, Agent, or Firm* — Nixon & Vanderhye, P.C.

(57) ABSTRACT

Disclosed is a display apparatus which performs wireless communication with a target control device and a peripheral display apparatus. The display apparatus may include communication circuitry which transmits to the peripheral display apparatus a request message requesting a determination of whether an operation command of the target control device is received when the target control device is operated; and a controller configured to perform a function corresponding to the operation command of the target control device based on a response message to the request message. In the display apparatus and a control system and method for the same, the display apparatus is able to be controlled through a control device paired with a different display apparatus, and since a re-pairing process is not performed, an additional operation in which a user performs the re-pairing process may be removed, and thus user convenience may be improved.

29 Claims, 25 Drawing Sheets

(51) Int. Cl.
*H04L 12/28* (2006.01)
*H04N 21/41* (2011.01)
*G05B 11/01* (2006.01)
*G08C 19/16* (2006.01)
*H04N 5/44* (2011.01)
*H04N 21/422* (2011.01)
*H04N 21/436* (2011.01)
*H04N 21/4363* (2011.01)
*G08C 17/02* (2006.01)
*H04W 4/00* (2009.01)
*H04W 76/02* (2009.01)

(52) U.S. Cl.
CPC . *H04N 21/42204* (2013.01); *H04N 21/42207* (2013.01); *H04N 21/43615* (2013.01); *H04N 21/43637* (2013.01); *H04W 4/008* (2013.01); *H04W 76/021* (2013.01); *H04W 76/023* (2013.01); *G08C 2201/20* (2013.01); *G08C 2201/93* (2013.01); *H04N 2005/4407* (2013.01); *H04N 2005/4426* (2013.01)

(58) Field of Classification Search
USPC ..... 340/12.28, 12.22, 4.3, 4.11, 13.24, 12.5; 700/12, 19, 20, 275
See application file for complete search history.

(56) References Cited

U.S. PATENT DOCUMENTS

| | | | | |
|---|---|---|---|---|
| 9,059,775 | B2* | 6/2015 | Qin | H04W 12/06 |
| 9,258,508 | B2* | 2/2016 | Hardin | H04N 21/654 |
| 9,529,565 | B2* | 12/2016 | Bae | H04N 21/42225 |
| 2009/0023389 | A1 | 1/2009 | Paryani | |
| 2009/0027408 | A1 | 1/2009 | Hwang et al. | |
| 2009/0195407 | A1* | 8/2009 | Nakano | H04N 5/4403 340/12.23 |
| 2010/0328132 | A1* | 12/2010 | Reams | H04N 21/42225 341/176 |
| 2011/0317634 | A1* | 12/2011 | Wong | H04W 8/005 370/329 |
| 2012/0105724 | A1* | 5/2012 | Candelore | H04N 5/4403 348/569 |
| 2013/0050093 | A1 | 2/2013 | Kim et al. | |
| 2014/0044435 | A1* | 2/2014 | Kobayashi | H04W 8/005 398/130 |
| 2014/0071345 | A1 | 3/2014 | Park | |

FOREIGN PATENT DOCUMENTS

| | | |
|---|---|---|
| WO | 2012/009095 | 1/2012 |
| WO | 2013/049630 | 4/2013 |
| WO | 2014/107006 | 7/2014 |

OTHER PUBLICATIONS

Extended Search Report mailed Mar. 24, 2016 in counterpart European Application No. 15186554.0.

Communication mailed Nov. 10, 2016 in counterpart European Patent Application No. 15186554.0.

* cited by examiner

FIG.6

| DISPLAY APPARATUS | IDENTIFICATION INFORMATION |
|---|---|
| FIRST DISPLAY APPARATUS | BD_ADDR OF FIRST CONTROL DEVICE |
| SECOND DISPLAY APPARATUS | BD_ADDR OF SECOND CONTROL DEVICE |

FIG.7A

FIRST DISPLAY APPARATUS

| PRIORITY | IDENTIFICATION INFORMATION |
|---|---|
| 1 | BD_ADDR OF FIRST CONTROL DEVICE |
| 2 | BD_ADDR OF SECOND CONTROL DEVICE |

FIG.7B

SECOND DISPLAY APPARATUS

| PRIORITY | IDENTIFICATION INFORMATION |
|----------|---------------------------|
| 1 | BD_ADDR OF SECOND CONTROL DEVICE |
| 2 | BD_ADDR OF FIRST CONTROL DEVICE |

FIG.9

SECOND DISPLAY APPARATUS

| PRIORITY | IDENTIFICATION INFORMATION |
|----------|----------------------------|
| 1 | BD_ADDR OF FIRST CONTROL DEVICE |
| 2 | BD_ADDR OF SECOND CONTROL DEVICE |

FIG.12

| DISPLAY APPARATUS | IDENTIFICATION INFORMATION |
|---|---|
| FIRST DISPLAY APPARATUS | BD_ADDR OF FIRST CONTROL DEVICE |
| SECOND DISPLAY APPARATUS | BD_ADDR OF SECOND CONTROL DEVICE |
| THIRD DISPLAY APPARATUS | BD_ADDR OF THIRD CONTROL DEVICE |

FIG.13A

FIRST DISPLAY APPARATUS

| PRIORITY | IDENTIFICATION INFORMATION |
|---|---|
| 1 | BD_ADDR OF FIRST CONTROL DEVICE |
| 2 | BD_ADDR OF SECOND CONTROL DEVICE |
| 3 | BD_ADDR OF THIRD CONTROL DEVICE |

FIG.13B

SECOND DISPLAY APPARATUS

| PRIORITY | IDENTIFICATION INFORMATION |
|---|---|
| 1 | BD_ADDR OF SECOND CONTROL DEVICE |
| 2 | BD_ADDR OF THIRD CONTROL DEVICE |
| 3 | BD_ADDR OF FIRST CONTROL DEVICE |

FIG.13C

THIRD DISPLAY APPARATUS

| PRIORITY | IDENTIFICATION INFORMATION |
|----------|----------------------------|
| 1 | BD_ADDR OF THIRD CONTROL DEVICE |
| 2 | BD_ADDR OF FIRST CONTROL DEVICE |
| 3 | BD_ADDR OF SECOND CONTROL DEVICE |

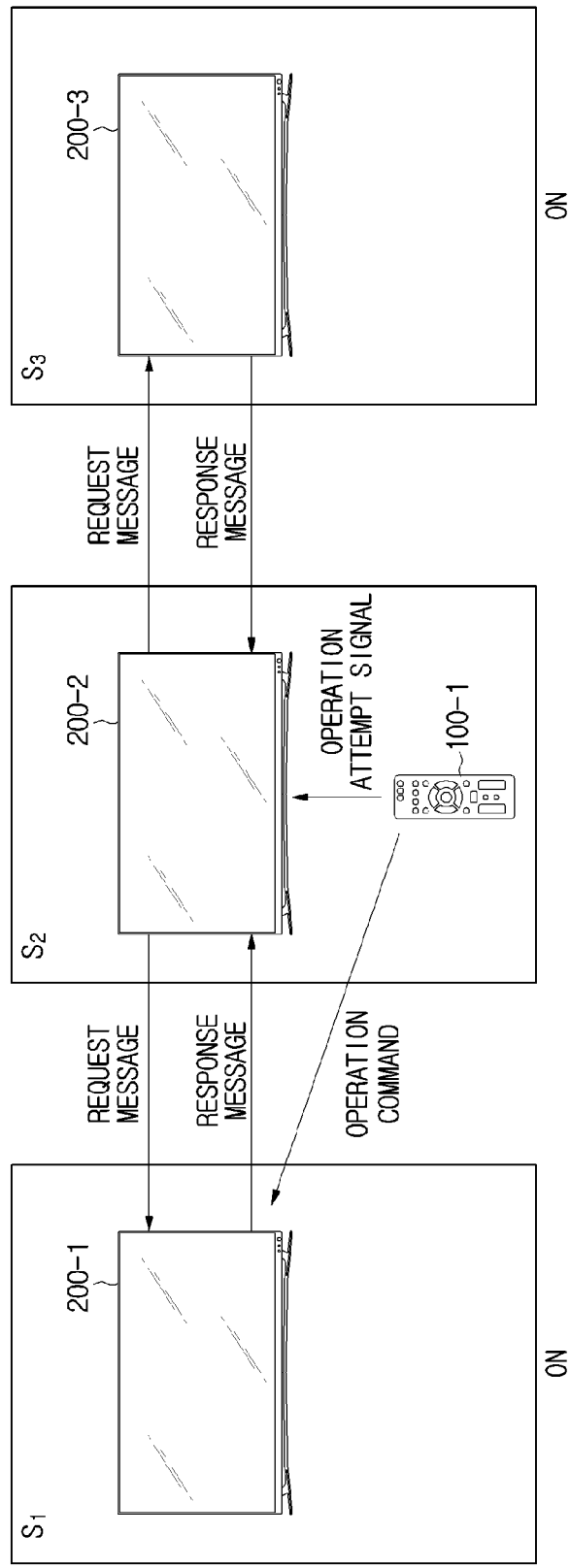

FIG.15

SECOND DISPLAY APPARATUS

| PRIORITY | IDENTIFICATION INFORMATION |
|---|---|
| 1 | BD_ADDR OF FIRST CONTROL DEVICE |
| 2 | BD_ADDR OF SECOND CONTROL DEVICE |
| 3 | BD_ADDR OF THIRD CONTROL DEVICE |

FIG.19A

SECOND DISPLAY APPARATUS

| PRIORITY | IDENTIFICATION INFORMATION |
|----------|----------------------------|
| 1 | BD_ADDR OF THIRD CONTROL DEVICE |
| 2 | BD_ADDR OF FIRST CONTROL DEVICE |
| 3 | BD_ADDR OF SECOND CONTROL DEVICE |

FIG.19B

SECOND DISPLAY APPARATUS

| PRIORITY | IDENTIFICATION INFORMATION |
|---|---|
| 1 | BD_ADDR OF SECOND CONTROL DEVICE |
| 2 | BD_ADDR OF THIRD CONTROL DEVICE |
| 3 | BD_ADDR OF FIRST CONTROL DEVICE |

DISPLAY APPARATUS AND CONTROL SYSTEM AND METHOD FOR SAME

CROSS-REFERENCE TO RELATED APPLICATION

This application is based on and claims priority under 35 U.S.C. §119 to Korean Patent Application No. 10-2014-0132521, filed on Oct. 1, 2014 in the Korean Intellectual Property Office, the disclosure of which is incorporated by reference herein in its entirety.

BACKGROUND

1. Field

Example embodiments relate to a display apparatus and a control system and method for the same.

2. Description of Related Art

Display apparatuses are devices including display panels that display images that users can watch. Display apparatuses may include television sets or monitors.

In order to control various electronic devices including display apparatuses, users may use control devices, for instance, remote controllers. As functions and types of electronic devices have advanced and increased, types of commands transmitted to the electronic devices through the control devices have been also varied and types of control device have also been varied.

In general, control devices conventionally adopt an infrared (IR) method. However, as amounts and types of data transmitted through the control devices increase, the control devices which adopt various wireless communication methods, for instance, radio frequency (RF) methods including Bluetooth, have been widely used.

When Bluetooth or another RF method or the like is adopted, pairing processes are required to transmit or receive data between control devices and electronic devices which are the targets of control, for instance, display apparatuses. In addition, when there are a plurality of display apparatuses, control devices which are paired one-to-one with the display apparatuses should be provided, and in order to use a control device which has been paired to a different display apparatus, a pairing process should be performed again.

SUMMARY

Therefore, aspects of the disclosure and example embodiments relate to a display apparatus and a control system and method for the same.

Additional aspects of the disclosure and example embodiments will be set forth in the detailed description which follows.

In accordance with an example embodiment, a display apparatus which performs wireless communication with a target control device and a peripheral display apparatus includes: communication circuitry configured to transmit to the peripheral display apparatus a request message requesting a determination of whether an operation command of the target control device is received when the target control device is operated; and a controller configured to control the control device such that a function corresponding to the operation command of the target control device is performed based on a response message to the request message.

The target control device may, for example, be one of control devices paired with the peripheral display apparatus.

The operation command may, for example, include Bluetooth data corresponding to the operation command.

When the target control device is operated, the communication circuitry may be configured to receive an operation attempt signal of the target control device, and when the operation attempt signal is received, the communication circuitry may be configured to transmit the request message.

The operation attempt signal may include an infrared (IR) signal.

The communication unit may receive pairing information of the peripheral display apparatus.

The pairing information may include identification information of each control device paired with the peripheral display apparatus.

The identification information may include a Bluetooth device address (BD_ADDR).

When the communication circuitry receives the response message from the peripheral display apparatus, the controller may be configured to change a priority of identification information of the target control device in the identification information to a highest priority based on the response message and the pairing information.

When the communication circuitry does not receive the response message from the peripheral display apparatus, the controller may be configured to sequentially change priorities of a number of the identification information based on the pairing information.

The communication circuitry may receive an operation command of the target control device based on the changing of the priority.

When the operation command is received, the controller may be configured to perform a function corresponding to the operation command.

In accordance with another aspect of the example embodiments, a control system for a display apparatus includes: a target control device; and a display apparatus which performs wireless communication with the target control device and a peripheral display apparatus, wherein the display apparatus includes: communication circuitry configured to transmit to the peripheral display apparatus a request message requesting a determination of whether an operation command of the target control device is received when the target control device is operated; and a controller which is configured to control the control device such that a function corresponding to the operation command of the target control device is performed based on a response message to the request message.

The target control device is one of control devices paired with the peripheral display apparatus.

When the target control device is operated, the communication circuitry may be configured to receive an operation attempt signal of the target control device, and when the operation attempt signal is received, the communication circuitry is configured to transmit the request message.

The communication circuitry may be configured to receive pairing information of the peripheral display apparatus.

The pairing information may include identification information of each control device paired with the peripheral display apparatus.

When the communication circuitry receives the response message from the peripheral display apparatus, the controller may be configured to change a priority of identification information of the target control device in the identification information to a highest priority based on the response message and the pairing information.

When the communication circuitry does not receive the response message from the peripheral display apparatus, the controller may be configured to sequentially change priorities of a number of the identification information based on the pairing information.

The communication circuitry may receive an operation command of the target control device based on the changing of the priority.

When the operation command is received, the controller may be configured to perform control such that a function corresponding to the operation command is performed.

In accordance with still another aspect of the example embodiments, a control method for a display apparatus which performs wireless communication with a target control device and a peripheral display apparatus includes: transmitting to the peripheral display apparatus a request message requesting a determination of whether an operation command of the target control device is received when the target control device is operated; and performing a function corresponding to the operation command of the target control device based on a response message to the request message.

The target control device may be one of control devices paired with the peripheral display apparatus.

Transmitting of the request message to the peripheral display apparatus may include: receiving an operation attempt signal of the target control device when the target control device is operated; and transmitting the request message when the operation attempt signal is received.

The control method for the display apparatus may further include receiving pairing information of the peripheral display apparatus.

The pairing information may include identification information of each control device paired with the peripheral display apparatus.

When the response message is received from the peripheral display apparatus, the control method for the display apparatus may further include changing a priority of identification information of the target control device in the identification information to a highest priority based on the response message and the pairing information.

When the response message is not received from the peripheral display apparatus, the control method for the display apparatus may further include sequentially changing priorities of a number of the identification information based on the pairing information.

The control such that the function corresponding to the operation command is performed may include receiving the operation command of the target control device based on the changing of the priority, and performing a function corresponding to the operation command when the operation command is received.

BRIEF DESCRIPTION OF THE DRAWINGS

These and/or other aspects and advantages of the example embodiments will become apparent from the following detailed description, taken in conjunction with the accompanying drawings, in which like reference numerals refer to like elements, and wherein:

FIG. 6 is view which illustrates pairing information stored in the display apparatus of FIG. 5;

FIGS. 7A and 7B are views illustrating identification information lists stored in the display apparatus of FIG. 5;

FIG. 9 is a view illustrating a renewed identification information list of a target display apparatus;

FIG. 12 is a view illustrating pairing information stored in the display apparatus of FIG. 11;

FIGS. 13A-13C are views illustrating an identification information list stored in the display apparatus of FIG. 11;

FIG. 14 is a view illustrating an operation of a target display apparatus according to FIG. 11 when an operation attempt signal is received;

FIG. 15 is a view illustrating a renewed identification information list of a target display apparatus;

FIGS. 19A and 19B are views illustrating a sequential change of priorities of a number of identification information.

DETAILED DESCRIPTION

Figure 1:
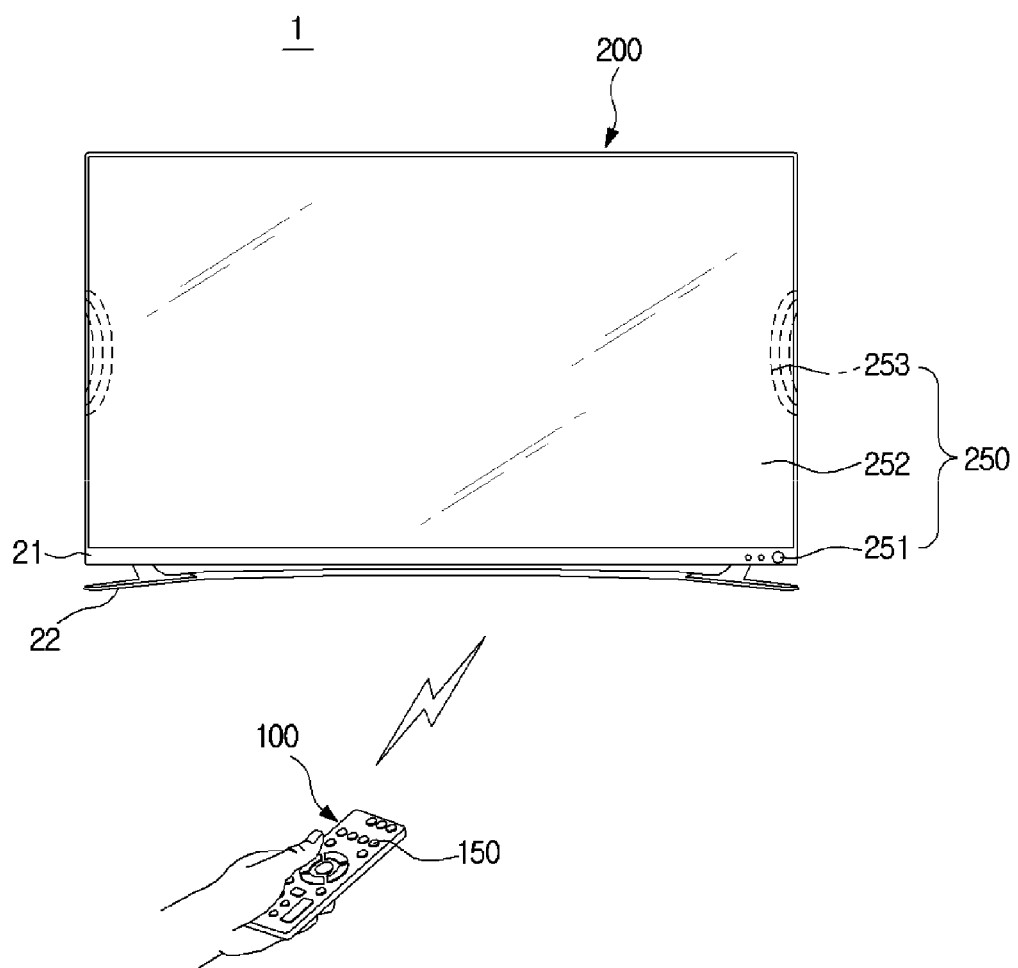
FIG. 1 is a view illustrating a display apparatus, a control device, and a control system for the display apparatus including the same.

Example embodiments described in this disclosure and configurations illustrated in the drawings are only examples. The disclosure covers various modifications that can substitute for the embodiments and drawings.

Hereinafter, a display apparatus, and a control system and method for the display apparatus will be described in detail in conjunction with example embodiments that are described with reference to the accompanying drawings. The same reference number refers to the same component throughout the drawings.

FIG. 1 is a view illustrating a display apparatus, a control device, and a control system for the display apparatus including the same.

Referring to FIG. 1, a control system 1 of a display apparatus may include a display apparatus 200 and a control device 100 to control the display apparatus 200.

The display apparatus 200 is a device having, for example, a function of displaying images, and may, for example, include a television set, a monitor, a smartphone, a notebook, a tablet and the like, but is not limited thereto. However, for the sake of convenience in the description, hereinafter, the display apparatus 200 implemented as a television set will be exemplified and described in detail.

As illustrated in FIG. 1, the display apparatus 200 may include a user interface unit 250 which has an input unit 251, a display unit 252, and an audio output unit 253, a housing 21 which is disposed outside the display unit 252 and is provided to protect the display unit 252 and electronic components of the display unit, and a base 22 which supports the display apparatus 200.

The input unit 251 is provided at a side of the housing 21, and receives various commands to execute operations of the control device 100 input, for example, by a user. For example, a user may input a power on/off command, a channel/volume control command, a screen control command or the like through the input unit 251.

As the input unit 251, a key pad, a dome switch, a touch pad having a constant voltage or current type, or the like which can receive commands by a push or touch method may be adopted. The touch pad may, for example, include a touch screen panel (TSP), and may have a structure having layers along with the display unit 252. In addition, as the input unit 251, a jog wheel, a joystick or the like on which a key can be rotated may be adopted.

The input unit 251 may also receive a command in a data form, and to this end, may, for example, include a motion recognition module, a voice recognition module and the like. The motion recognition module may, for example, include a camera and be used to recognize motion of a user or the control device 100. The voice recognition module may include a microphone and be used to recognize a user voice or a user voice command.

The display unit 252 displays various images or various screens according, for example, to user inputs. For example, the display unit 252 may output terrestrial broadcasting which is received in real time, or a broadcasting VOD or movie VOD selected by the user. In addition, the display unit 252 may output a menu screen for the configuration of the display apparatus 200.

As the display unit 252, a cathode ray tube (CRT), a digital light processing (DLP) panel, a plasma display panel, a liquid crystal display (LCD) panel, an electro luminescence (EL) panel, a electrophoretic display (EPD) panel, a electrochromic display (ECD) panel, a light emitting diode (LED) panel, an organic light emitting diode (OLED) panel or the like may be adopted, but is not limited thereto.

In addition, the display unit 252 may be formed of a flexible display having a changeable shape, for example, a changeable curvature. When the shape of the display unit 252 is changeable, the display unit 252 may be provided to have a certain curvature, or may be provided to be able to switch to one state of a flat surface state or a curved surface state having curvature. For example, the display unit 252 may be provided to have both side end units protruding forward from a center and have a certain curvature.

As described above, when the display unit 252 is formed of a TSP which has a layer structure along with a touch pad, the display unit 252 may also be used as an input device in addition to a display apparatus.

A base panel (not shown) which is formed in a shape corresponding to the display unit 252 and supports a rear surface of the display unit 252 may be provided at the rear surface of the display unit 252, and an audio output unit 253 may be provided at one side or both sides of the display unit 252.

The audio output unit 253 may output audio data related to images. For example, the audio output unit 253 may output audio data included in terrestrial broadcasting received in real time or a broadcasting VOD or movie VOD selected by a user. The audio output unit 253 may be formed of a speaker, a buzzer or the like, but is not limited thereto.

The housing 21 may be formed to cover an edge of a front surface of the display unit 252 and a rear surface, and the base 22 supported by an installation surface, such as a floor, on which the display apparatus 200 is installed may be provided below the housing 21. The display apparatus 200 may also be installed on a wall by a bracket or the like, and in this case, the base 22 may be omitted.

The control device 100 may, for example, be a device for remotely controlling the display apparatus 200 based on an input, such as, for example, a user input, and may include a remote controller, a mobile communication terminal, a smartphone, a notebook, a tablet or the like, but is not limited thereto. However, for the sake of convenience in the description, the control device 100 implemented as a remote controller will be described.

The control device 100 may include an input unit 150 which receives user commands. The user may input various commands, for example, a power on/off command, a channel/volume control command, a screen control command, a function selection command, and a menu moving/selecting command, to operate the display apparatus 200 through the input unit 150.

As the input unit 151, a key pad, a dome switch, a touch pad having a constant voltage or current type, or the like which can receive user commands by a push or touch method may be adopted. The touch pad may be formed of a touch screen panel (TSP), and in this case, the input unit 152 may be used as a display apparatus in addition to an input device. In addition, the input unit 150, may included a jog wheel, a joystick or the like on which a key can be rotated may be adopted. The input unit 150 may include a motion recognition module, such as a camera, or a voice recognition module, such as a microphone, and thus the input unit 150 may also receive user commends in the form of data, such as motion data or voice data.

The control device 100 may be connected to the display apparatus 200 through wireless communication. The control device 100 may be paired with the display apparatus 200 through wireless communication, and may transmit user commands which are input in the control device 100 to the paired display apparatus 200. The control device 100 may be provided to correspond in number to the display apparatus 200, and may form a one-to-one pairing relation with the display apparatus 200. For example, when the display apparatus 200 is provided in a plurality, each of the display apparatuses 200 may have a paired control device 100.

Figure 2A:
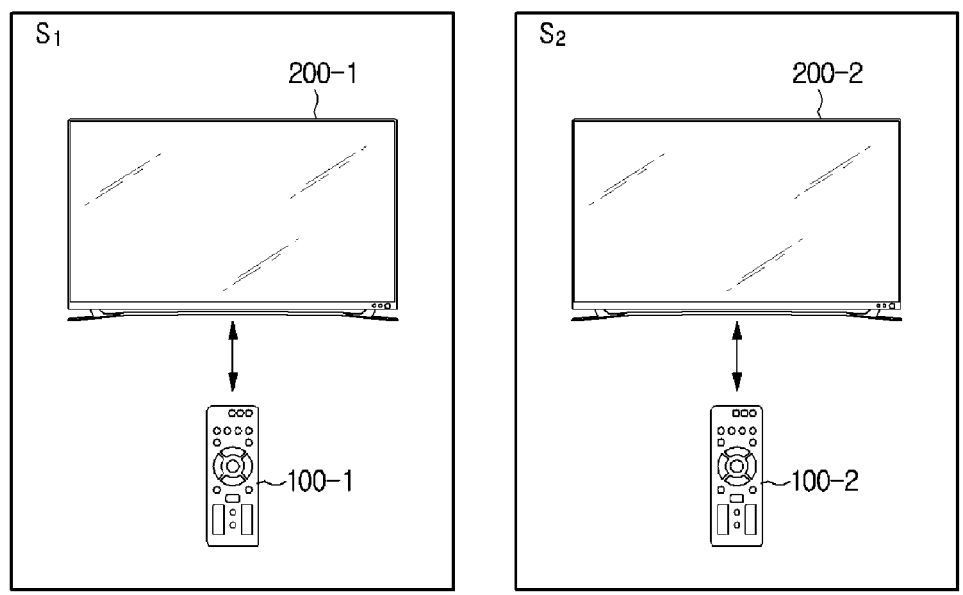
FIGS. 2A and 2B are views illustrating a pairing relation between control devices and display apparatuses.
Figure 2B:
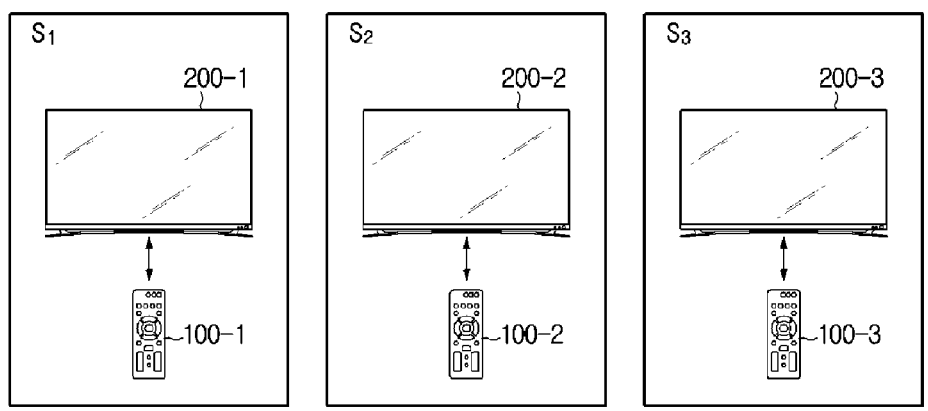

FIGS. 2A and 2B are views illustrating a pairing relation between control devices and display apparatuses.

Referring to FIGS. 2A and 2B, a plurality of display apparatuses 200, e.g., 200-1, 200-2, 200-3, are provided in a certain area, and the plurality of display apparatuses 200 may be connected to each other through wireless communication. For example, the certain area is an area in which the plurality of display apparatuses 200 can be connected through wireless communication.

The plurality of display apparatuses 200 may be separately provided in a plurality of separated spaces. As illustrated in FIG. 2A, the plurality of display apparatuses 200 may include a first display apparatus 200-1 and a second display apparatus 200-2, the first display apparatus 200-1 may be provided in a first space S1, and the second display apparatus 200-2 may be provided in a second space S2. As illustrated in FIG. 2B, the plurality of display apparatuses 200 may include the first display apparatus 200-1, the second display apparatus 200-2, and a third display apparatus 200-3, the first display apparatus 200-1 may be provided in the first space S1, the second display apparatus 200-2 may be provided in the second space S2, and the third display apparatus 200-3 may be provided in a third space S3.

However, FIGS. 2A and 2B are only examples, and the number of the display apparatuses 200 is not limited thereto.

The plurality of display apparatuses 200 may form the one-to-one pairing relation with the control devices 100, and each display apparatus 200 may be controlled by the control device 100 paired therewith.

In FIG. 2A, for example, the first display apparatus 200-1 is paired with the first control device 100-1 which is located in the same area in which the first display apparatus 200-1 is located, and the second display apparatus 200-2 is paired with the second control device 100-2 which is located in the same area in which the second display apparatus 200-2 is located.

In this case, the first display apparatus 200-1 may be controlled by the first control device 100-1, and the second display apparatus 200-2 may be controlled by the second control device 100-2. For example, user commands input to the first control device 100-1 are transmitted to the first display apparatus 200-1, and the first display apparatus 200-1 operates based on the user commands input to the first control device 100-1. In the same way, user commands input to the second control device 100-2 are transmitted to the second display apparatus 200-2, and the second display apparatus 200-2 operates based on the user commands input to the second control device 100-2.

In FIG. 2B, for example, the first display apparatus 200-1 is paired with the first control device 100-1 which is located in the same area in which the first display apparatus 200-1 is located, the second display apparatus 200-2 is paired with the second control device 100-2 which is located in the same area in which the second display apparatus 200-2 is located, and the third display apparatus 200-3 is paired with the third control device 100-3 which is located in the same area in which the third display apparatus 200-3 is located.

In this case, for example, the first display apparatus 200-1 may be controlled by the first control device 100-1, the second display apparatus 200-2 may be controlled by the second control device 100-2, and the third display apparatus 200-3 may be controlled by the third control device 100-3. For example, user commands input to the first control device 100-1 are transmitted to the first display apparatus 200-1, and the first display apparatus 200-1 operates according to the user commands input to the first control device 100-1. User commands input to the second control device 100-2 are transmitted to the second display apparatus 200-2, and the second display apparatus 200-2 operates according to the user commands input to the second control device 100-2. In the same way, user commands input to the third control device 100-3 are transmitted to the third display apparatus 200-3, and the third display apparatus 200-3 operates according to the user commands input to the third control device 100-3.

As described above, each of the display apparatuses 200 may be controlled by the control device 100 paired therewith. However, when a display apparatus 200 and a control device 100 paired therewith are not located in the same space, or a display apparatus 200 and a control device 100 paired with a different display apparatus 200 are located in the same location, it may be necessary for the corresponding display apparatus 200 to be controlled by the control device 100 paired with a different display apparatus 200. For example, in FIG. 2A or 2B, when the first control device 100-1 paired with the first display apparatus 200-1 and the second display apparatus 200-2 are located in the same space, for example, the second space S2, the second display apparatus 200-2 may need to be controlled by the first control device 100-1.

In order for the display apparatus 200 to be controlled by the control device 100 paired with the different display apparatus 200, a process of re-pairing the control device 100 paired with the different display apparatus 200 with the corresponding display apparatus 200 may be performed. However, the control system 1 of the display apparatus that is formed to be controllable by a control device 100 paired with a different display apparatus 200 without performing the re-pairing process will be described with reference to an accompanying block diagram.

In addition, hereinafter, a display apparatus 200 to be controlled is defined as "a target display apparatus 200," and a display apparatus 200 located at a periphery of the target display apparatus 200, for example, located in a certain area from the target display apparatus 200 and performing wireless communication with the target display apparatus 200 is defined as "a peripheral display apparatus 200," and even if a control device 100 is paired with a display apparatus 200 other than the target display apparatus 200, the control device 100 which is operated by a user to control a target display apparatus 200 is defined as "a target control device 100."

Figure 3:
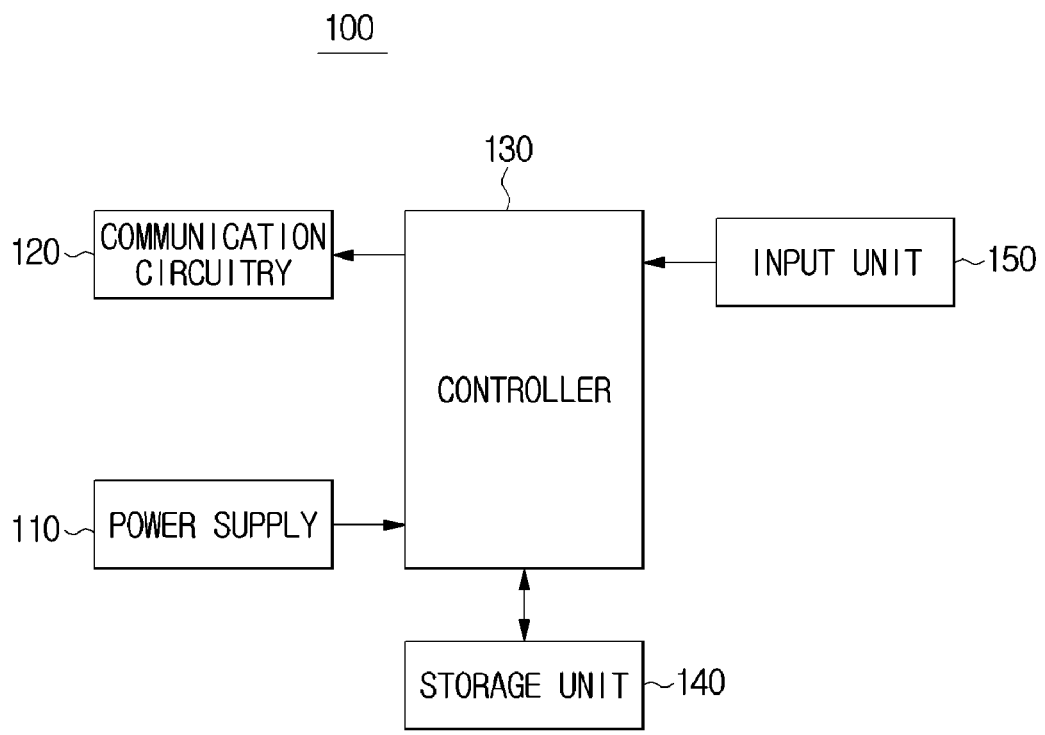
FIG. 3 is a control block diagram illustrating a control device.
Figure 4:
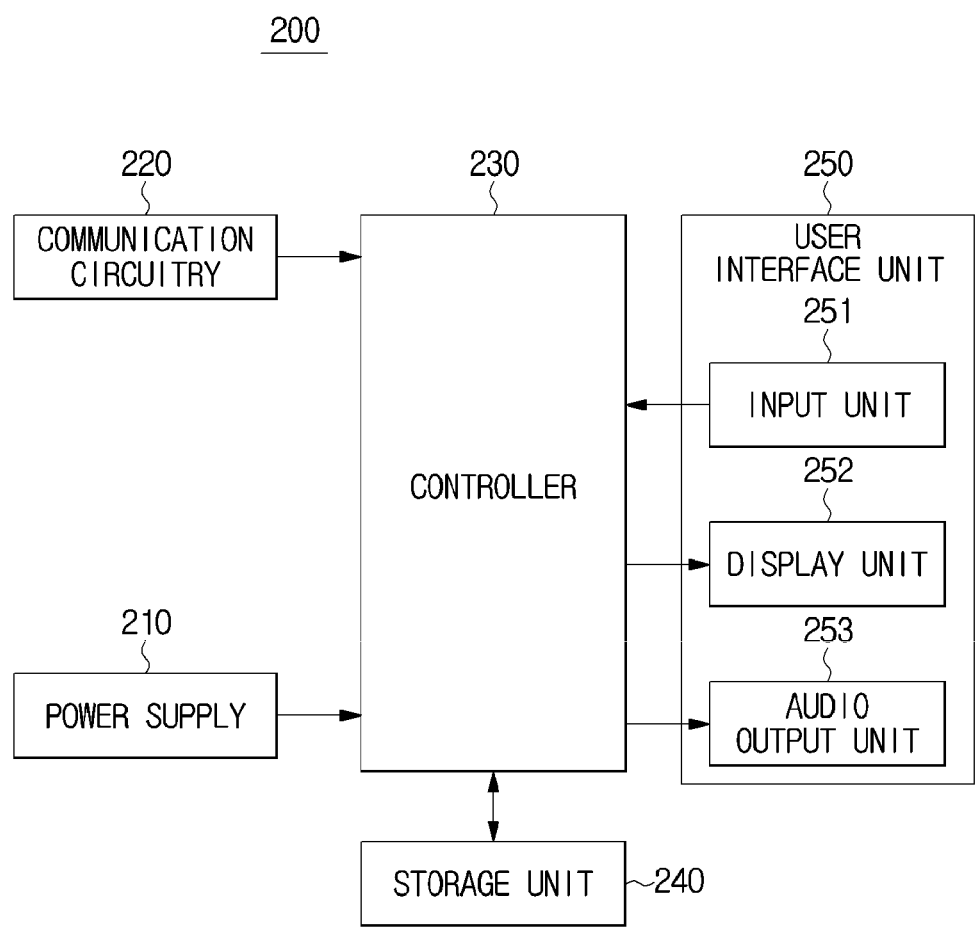
FIG. 4 is a control block diagram illustrating a display apparatus.

FIG. 3 is a block diagram illustrating a control device, and FIG. 4 is a block diagram illustrating a display apparatus.

Referring to FIGS. 3 and 4, the control device 100 may include a power supply 110, communication circuitry in the form of, for example, a communication unit 120, a controller 130, a storage unit 140, and an input unit 150, and the display apparatus 200 may include a power supply 210, communication circuitry in the form of, for example, a communication unit 220, a controller 230, a storage unit 240, and a user interface unit 250. Here, the control device 100 may be a target control device 100, and the display apparatus 200 may be a target display apparatus 200.

The power supply 110 supplies driving power to drive the control device 100. The power supply 110 may be implemented by a battery which is electrically connected to various components mounted on the control device 100 and supply driving power. The power supply 110 may be implemented by a primary battery, for example, a mercury battery, a manganese battery, an alkaline battery, and a lithium battery, and also a secondary battery, for example, a Ni—Cd battery, a Ni—NH battery, a lead acid storage battery, a Li-ion battery, a lithium polymer battery. In addition, the power supply 110 may also be implemented by a solar battery which generates electricity using solar heat, but is not limited to that type.

The input unit 150 receives user commands. The input unit 150 receives various commands from a user to operate the display apparatus 200. For example, the input unit 150 may receive on/off commands, channel/volume control commands, screen control commands, function selection commands, menu moving/selection commands or the like from a user, and since the implementation type of the input unit 150 has been described above, it will be omitted below.

The controller 130 is configured to control overall operations of the control device 100. The controller 130 is supplied with power of the power supply 110, and is configured to control an operation of each unit of the control device 100, for example, the communication unit 120 and the storage unit 140.

For example, when paired with a control device 100, the controller 130 may be configured to control the storage unit 140 to store information of the display apparatus 200 paired with the control device 100. The controller 130 may also be configured to control the storage unit 140 to store a user command input through the input unit 150.

In addition, the controller 130 may be configured to convert a user command input through the input unit 150 into a form of data which is receivable by the display apparatus 200, and may be configured to control the communication unit 120 to transmit the user command converted into the form of data to the display apparatus 200.

The controller 130 may be configured to control the communication unit 120 to transmit the user command converted into the form of data to the paired display apparatus 200. For example, when the control device 100 and the display apparatus 200 perform wireless communication using a Bluetooth method, the controller 130 may be configured to convert a user command into Bluetooth data, and to control the communication unit 120 to transmit the user command which is converted into the Bluetooth data to the paired display apparatus 200.

When a control priority of the control device 100 is changed to control the target display apparatus 200, the controller 130 may be configured to control the communication unit 120 to transmit a user command converted into the form of data to the target display apparatus 200. Here, the specific description of the control priority change of the control device 100 will be described below along with the description of the display apparatus 200.

In addition, a user command which is converted into the form of data receivable by the display apparatus 200, for example, Bluetooth data, may be referred to as an operation command hereinafter.

The controller 130 may be configured to control the communication unit 120 to transmit an operation attempt signal to the target display apparatus 200. The controller 130 may be configured to control the communication unit 120 to transmit the operation command to the paired display apparatus 200, and to simultaneously transmit the operation attempt signal to the target display apparatus 200. For example, when a user command is input through the input unit 150, the communication unit 120 may be configured to transmit an operation command to the paired display apparatus 200 based on a control signal of the controller 130, and to simultaneously transmit an operation attempt signal to the target display apparatus 200.

Here, an 'operation attempt signal' may, for example, be referred to as a signal which indicates that a user is attempting to operate the target control device 100 to control the target display apparatus 200, and when the control device 100 and the display apparatus 200 perform IR communication, the operation attempt signal may include an IR signal, but is not limited thereto.

The above-described controller 130 may, for example, be formed of various processors including at least one chip in which an integrated circuit is formed. In addition, the controller 130 may, for example, be formed of one processor, but may also be provided to be separated from a plurality of processes.

The communication unit 120 is configured to perform wireless communication with the display apparatus 200. The communication unit 120 performs wireless communication with the paired display apparatus 200, and performs wireless communication with the display apparatus 200 located in the same area, for example, the target display apparatus 200.

The communication unit 120 may transfer or receive data to or from the paired display apparatus 200. For example, the communication unit 120 may receive information of the paired display apparatus 200. In addition, the communication unit 120 may transmit an operation command based on a user input to the paired display apparatus 200.

As described above, the communication unit 120 may transmit or receive data to or from the paired display apparatus 200 using, for example, a Bluetooth method, and in this case, the operation command may include 'Bluetooth data.' However, as long as the operation command can be transmitted, a communication method between the communication unit 120 and the display apparatus 200 paired therewith is not limited to a Bluetooth method, and a type of the operation command is not limited to Bluetooth data.

The communication unit 120 may transmit an operation attempt signal based on a user input to the target display apparatus 200. As described above, the communication unit 120 may perform, for example, IR communication with the target display apparatus 200, and in this case, the operation attempt signal may include an 'IR signal.' However, as long as the operation attempt signal can be transmitted, a communication method between the communication unit 120 and the target display apparatus 200 is not limited to the IR communication, and a type of the operation attempt signal is not limited to the IR signal.

When a control priority of the control device 100 is changed to control the target display apparatus 200, the communication unit 120 may transmit an operation command based on a user input to the target display apparatus 200. An apparatus which receives the operation command of the communication unit 120 may be changed from the paired display apparatus 200 to the target display apparatus 200. For example, based on a change of the control priority of the control device 100, the communication unit 120 may transmit the operation command to the target display apparatus 200, or the target display apparatus 200 may receive the operation command of the communication unit 120.

In addition, as described above, the communication method for transmitting the operation command and the communication method for transmitting the operation attempt signal may be different from each other, for example, a Bluetooth method and an IR method, or the same method may be used.

To this end, the communication unit 120 may include various communication modules, for example, a wireless Internet module, a near field communication module, a mobile communication module, etc.

The wireless Internet module is a module which is connected to an outside network and performs communication based on a communication protocol, for example, wireless LAN (WLAN), Wi-Fi, Wireless Broadband (WiBro), Worldwide Interoperability for Microwave Access (WiMAX), High-Speed Downlink Packet Access (HSDPA), etc.

The near field communication module may be a module for performing communication with outside devices located adjacent to each other based on a near field communication method, for example, Bluetooth, radio frequency identification (RFID), Infrared Data Association (IrDA) communication, ultra wideband (UWB), ZigBee and the like.

The mobile communication module is a module which accesses a mobile communication network and performs communication based on various mobile communication protocols, for example, third generation (3G), Third Generation Partnership Project (3GPP), Long Term Evolution (LTE), etc.

However, the disclosure is not limited thereto, and as long as the communication unit 120 can communicate with the display apparatus 200, the communication unit 120 may adopt other types of communication modules in addition to the modules described above.

The storage unit 140 may temporarily or permanently store data and programs to operate the control device 100.

For example, the storage unit 140 may store information of the paired display apparatus 200, and may temporarily or permanently store user commands or operation commands input through the input unit 150.

In addition, when user commands are input, the storage unit 140 may store programs to convert the input user commands into operation commands that the display apparatus 200 may receive and analyze, and transfer the operation commands and operation attempt signals.

The storage unit 140 described above may include at least one type of storage medium, for example, a flash memory type, a hard disk type, a multimedia card micro type, a cart type memory such as a Secure Digital (SD) or extreme digital (XD) memory, a random access memory (RAM), a static RAM (SRAM), a read-only memory (ROM), an electrically erasable programmable ROM (EEPROM), a programmable ROM (PROM), a magnetic RAM (MRAM), a magnetic disk, an optical disc, etc. However, the present disclosure is not limited thereto, and may be implemented using different types known in the art. In addition, the control device 100 may use web storages which perform a storage function on the Internet.

The power supply 210 is supplied with outside power or inner power, and supplies driving power to operate the display apparatus 200. The power supply 210 is electrically connected to each unit of the display apparatus 200, for example, the communication unit 220, the controller 230, the user interface unit 250, and the storage unit 240, and supplies the driving power thereto.

The power supply 210 may be implemented by a primary battery, for example, a mercury battery, a manganese battery, an alkaline battery, and a lithium battery, and also a secondary battery such as a Ni—Cd battery, a Ni—NH battery, a lead acid storage battery, a Li-ion battery, or a lithium polymer battery. In addition, the power supply 210 may be implemented by a solar battery which generates electricity using solar heat, but is not limited to that type. When the power supply 210 is supplied with outside power, a user may connect the display apparatus 1 and the outside power supply using a wire, and charge the power supply 210.

The controller 230 is configured to control overall operations of the display apparatus 200. The controller 230 is supplied with power from the power supply 210, and is configured to control each unit of the display apparatus 200, for example, the communication unit 220, the storage unit 240, the display unit 252, and the audio output unit 253.

The controller 230 may be configured to control the communication unit 220 to transmit, receive, or share pairing information with the different display apparatus 200. Here, the pairing information may include identification information of the paired control device 100.

As illustrated in FIG. 2, the controller 230 of the first display apparatus 200-1 may be configured to control the communication unit 220 to transmit identification information of the first control device 100-1, for example, the identification information of the control device 100-1 paired with the first display apparatus 200-1, to a different display apparatus, for example, the second display apparatus 200-2. In addition, the controller 230 of the second display apparatus 200-2 may be configured to control the communication unit 220 to transmit identification information of the second control device 100-2, for example, the identification information of the control device 100-2 paired with the second display apparatus 200-2, to the first display apparatus 200-1.

In addition, as illustrated above in FIG. 3, the controller 230 of the first display apparatus 200-1 may be configured to control the communication unit 220 to transmit identification information of the first control device 100-1, for example, the identification information of the control device 100-1 paired with the first display apparatus 200-1, to a different display apparatus, for example, the second display apparatus 200-2 and the third display apparatus 200-3. The controller 230 of the second display apparatus 200-2 may be configured to control the communication unit 220 to transmit identification information of the second control device 100-2, for example, the identification information of the second control device 100-2 paired with second display apparatus 200-2, to the first display apparatus 200-1 and the third display apparatus 200-3. In the same way, the controller 230 of the third display apparatus 200-3 may be configured to control the communication unit 220 to transmit identification information of the third control device 100-3, for example, the identification information of the third control device 100-3 paired with the display apparatus 200-3, to the first display apparatus 200-1 and the second display apparatus 200-2.

When the communication unit 220 receives an operation attempt signal from the target control device 100 or the controller 230 that is included in the target display apparatus 200, the controller 230 is configured to control the communication unit 220 to transmit to the peripheral display apparatus 200 a request message requesting determination on whether an operation command is received.

When the communication unit 220 receives a response message to the request message from the peripheral display apparatus 200, the controller 230 may be configured to identify the target control device 100 based on the response message, change a control priority of the target control device 100 to the highest priority, and be controlled by the target control device 100. The controller 230 may be configured to generate an identification information list of the control device 100 based on pairing information received from the peripheral display apparatus 200, change a priority of identification information of the target control device 100 to the highest priority in the identification information list, and change a control priority of the target control device 100 to the highest priority. This will be described below When the communication unit 220 does not receive a response message to the request message from the display apparatus 200, the controller 230 may be configured to sequentially perform a priority change of the identification information list, and identify the target control device 100. Identification of the target control device 100 will be described below.

The control priority of the target control device 100 may be changed to the highest priority, or the target control device 100 is identified, and the operation command of the target control device 100 may be received through the communication unit 220. The controller 230 may be configured to perform an operation or function corresponding to the received operation command.

The controller 230 may be configured to control, for example, a display unit 252 or an audio output unit 253 based on operation commands. As an example, when an operation command includes a "channel change command," the controller 230 may be configured to control the display unit 252 to output a screen of the changed channel. In addition, when an operation command includes a "volume adjustment command," the controller 230 may be configured to control the audio output unit 253 to output sound at the adjusted volume.

Meanwhile, when the communication unit 220 does not receive the operation attempt signal from the target control device 100, or the controller 230 is included in the peripheral display apparatus 200, the controller 230 may be configured to control the communication unit 220 to transmit to the target display apparatus 200 a response message to the request message described above.

The controller 230 may be configured to control the storage unit 240 to store pairing information received from the different display apparatus 200. The controller 230 may be configured to control the storage unit 240 to generate an identification information list of the control device 100 based on the pairing information, and store the generated identification information list. When a priority change in the identification information list is performed, the controller 230 may be configured to control the storage unit 240 to store the revised identification information list based on the changing of the priority.

The controller 230 described above may, for example, be formed of various processors including at least one chip in which an integrated circuit is formed. In addition, the controller 230 may, for example, be provided in one processor, or may be provided to be separated from a plurality of processors.

The communication unit 220 may be configured to perform communication with outside servers or outside devices of various types, and transmit or receive various signals or information based on various communication methods.

For example, the communication unit 220 may receive image data or audio data to be output to the user interface unit 250, for example, through the display unit 252 or the audio output unit 253, from broadcasting servers or mobile communication servers.

In addition, the communication unit 220 may perform wireless communication between the control device 100 and the different display apparatus 200.

When the communication unit 220 is included in the target display apparatus 200, the communication unit 220 may receive an operation attempt signal from the target control device 100. In addition, the communication unit 220 may transmit to the peripheral display apparatus 200 a request message requesting determination on whether an operation command is received, and may receive a response message to the request message from the peripheral display apparatus 200. In addition, a priority change of an identification information list is performed, and the communication unit 220 may receive the operation command from the target control device 100.

When the communication unit 220 is included in the peripheral display apparatus 200, for example, when the communication unit 220 is included in the display apparatus 200 paired with the target control device 100, the communication unit 220 may receive an operation command from the target control device 100. In addition, the communication unit 220 included in the peripheral display apparatus 200 may receive the request message described above from the target display apparatus 200, and may transmit a response message to the request message to the target display apparatus 200.

To this end, the communication unit 220 may include various communication modules, for example, broadcast receiving modules, wireless Internet modules, near field communication modules, mobile communication modules, etc.

A broadcast receiving module may include terrestrial broadcast receiving modules including antennas, demodulators, equalizer and the like to receive terrestrial broadcasting signals, digital multimedia broadcasting (DMB) modules to receive and process DMB signals, and the like. Since the wireless Internet module, the near field communication module, and the mobile communication module are the same as those described above, descriptions will be omitted below.

In addition, the present disclosure is not limited thereto, and as long as the control device 100 and the different display apparatus 200 can perform communication with outside devices or outside servers, the communication unit 220 may adopt other types of communication modules in addition to the communication modules described above.

The storage unit 240 may temporarily or permanently store data and programs to operate the display apparatus 200. For example, the storage unit 240 may temporarily or permanently store image data or audio data received from an outside device or an outside server. In addition, the storage unit 240 may store pairing information received from the different display apparatus 200. The storage unit 240 may store an identification information list of the control device 100 generated based on the pairing information, and when a priority change is performed, the storage unit 240 may store the identification information list revised based on the changing of the priority.

When an operation attempt signal is received, the storage unit 240 may store a program to transmit a request message, and when a request message is received, the storage unit 240 may store a program for transmitting a response message, a program for identifying the target control device 100 based on the response message, or the like. In addition, the storage unit 240 may store a program for generating an identification information list of the control device 100 based on pairing information, a program for renewing or revising the identification information list based on the priority change, or the like.

The storage unit 240 described above may include at least one type of storage medium, for example, a flash memory type, a hard disk type, a multimedia card micro type, a card type memory such as an SD or XD memory, a RAM, an SRAM, a ROM, an EEPROM, a PROM, an MRAM, a magnetic disk, and an optical disc. However, it is not limited thereto, and may be implemented in arbitrary different types known in the art. In addition, the display apparatus 200 may use web storages which perform a storage function on the Internet.

The structure of the control system 1 of the display apparatus was described above with reference to the control block diagram, and the operation of the control system 1 of the display apparatus will be described hereinafter with reference to FIGS. 5 to 19.

FIGS. 5 to 10 are views illustrating example operation of a control system of a display apparatus. In FIGS. 5 to 10, the display apparatus 200 and the control device 100 are the same as illustrated in FIG. 2A. For example, it may be illustrated that the display apparatus 200 includes the first display apparatus 200-1 provided in the first space S1 and the second display apparatus 200-2 provided in the second space S2, the first display apparatus 200-1 is paired with the first control device 100-1, and the second display apparatus 200-2 is paired with the second control device 100-2.

Figure 5:
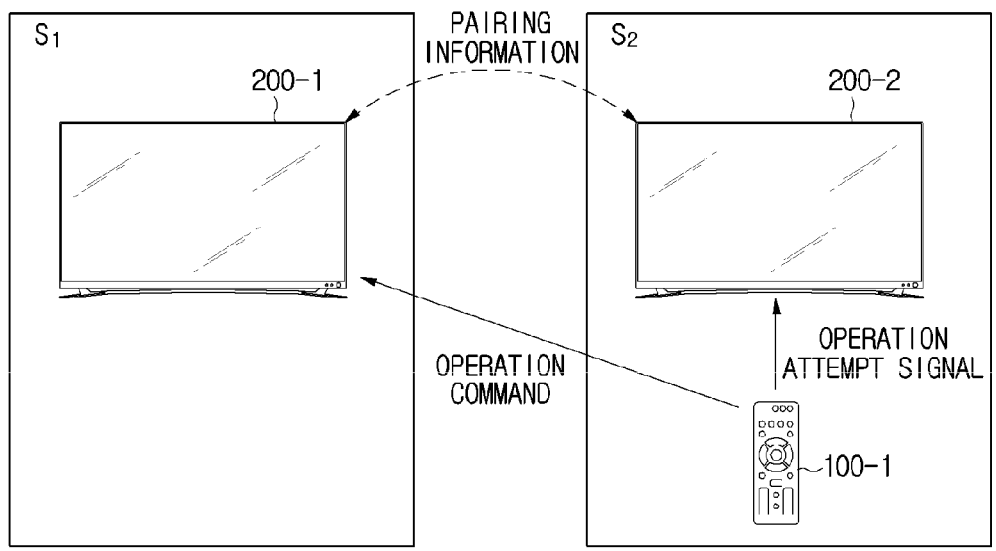
FIG. 5 is a view illustrating an example in which a control device which is paired with a peripheral display apparatus becomes a target control device.

FIG. 5 is a view illustrating an example in which a control device which is paired with a peripheral display apparatus becomes a target control device, FIG. 6 is view illustrating pairing information stored in the display apparatus in FIG. 5, and FIG. 7 is a view illustrating identification information lists stored in the display apparatus in FIG. 5.

In FIG. 5, illustrates the first control device 100-1 which is paired with the first display apparatus 200-1, is located in the same area as the second display apparatus 200-2, and is operated by a user to control the second display apparatus 200-2. For example, the second display apparatus 200-2 becomes a display apparatus to be controlled, for example, a target display apparatus, and the first control device 100-1 paired with the first display apparatus 200-1 becomes a target control device to be controlled by the user.

The first display apparatus 200-1 may search for a different display apparatus located in a certain area, for example, the second display apparatus 200-2, through the communication unit 220, and may transmit, receive, and share pairing information with the located second display apparatus 200-2. Otherwise, the second display apparatus 200-2 may search for a different display apparatus located in a certain area, for example, the first display apparatus 200-1, through the communication unit 220, and may transmit, receive, and share the pairing information with the located first display apparatus 200-1.

Sharing of pairing information between the first display apparatus 200-1 and the second display apparatus 200-2 may be performed before an operation of the target control device 100-1, and the pairing information may be stored in the first display apparatus 200-1 and the second display apparatus 200-2.

As described above, pairing information may include identification information of the paired control device 100. The pairing information may include identification information of the first control device 100-1 paired with the first display apparatus 200-1 and identification information of the second control device 100-2 paired with the second display apparatus 200-2.

Thus, when the control device 100 and the display apparatus 200 perform communication, for example, using a Bluetooth method, the storage unit 240 of the first display apparatus 200-1 and the storage unit 240 of the second display apparatus 200-2 may each store pairing information as illustrated in FIG. 6.

For example, the storage unit 240 of the first display apparatus 200-1 may store a Bluetooth device address (BD_ADDR) of the first control device 100-1 paired with the first display apparatus 200-1 corresponding to the first display apparatus 200-1, and may store a BD_ADDR of the second control device 100-2 paired with the second display apparatus 200-2 corresponding to the second display apparatus 200-2. Similarly, the storage unit 240 of the second display apparatus 200-2 may also store a BD_ADDR of the first control device 100-1 paired with the first display apparatus 200-1 corresponding to the first display apparatus 200-1, and may store a BD_ADDR of the second control device 100-2 paired with the second display apparatus 200-2 corresponding to the second display apparatus 200-2.

The first display apparatus 200-1 and the second display apparatus 200-2 may generate and store an identification information list of the control device 100 based on the pairing information.

The controller 230 of the first display apparatus 200-1 may be configured to generate identification information based on the pairing information so that a control priority of the first control device 100-1 paired with the first display apparatus 200-1 is the highest priority, and the generated identification information list may be stored in the storage unit 240. For example, as illustrated in FIG. 7A, the storage unit 240 of the first display apparatus 200-1 may store the identification information list in which a BD_ADDR of the first control device 100-1 has the first priority.

In addition, the controller 230 of the second display apparatus 200-2 may be configured to generate an identification information list based on the pairing information so that a control priority of the second control device 100-2 paired with the second display apparatus 200-2 is the highest priority, and the generated identification information list may be stored in the storage unit 240. For example, as illustrated in FIG. 7B, the storage unit 240 of the second display apparatus 200-2 may store the identification information list in which a BD_ADDR of the second control device 100-2 has the first priority.

Referring to FIG. 5, when a user command is input through the input unit 150 of the target control device 100-1, the communication unit 120 of the target control device 100-1 transmits an operation attempt signal to a target display apparatus located in the same area, for example, the second display apparatus 200-2, and transmits an operation command to the first display apparatus 200-1 paired with the target control device 100-1.

Figure 8:
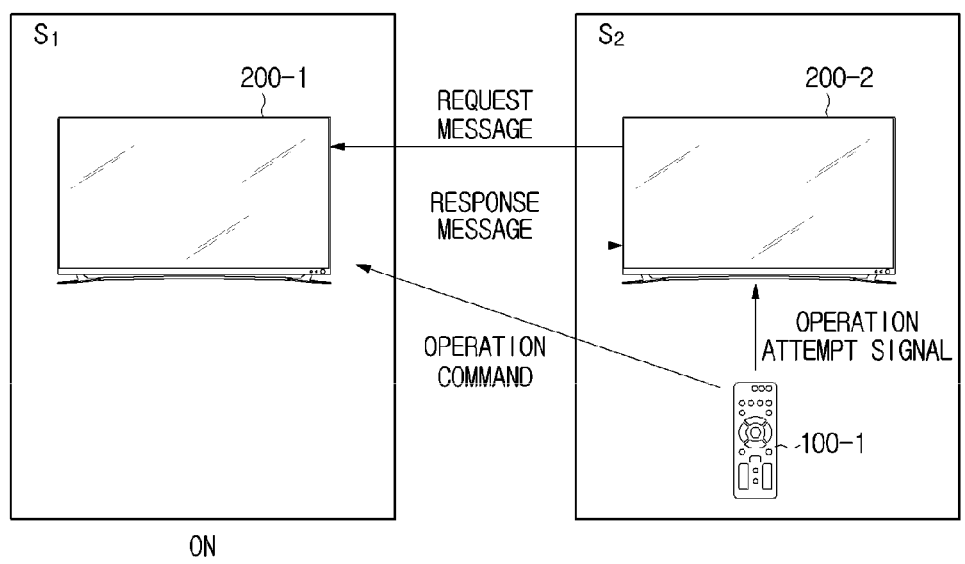
FIG. 8 is a view illustrating an operation of the target display apparatus according to FIG. 5 when an operation attempt signal is received.

FIG. 8 is a view illustrating an operation of the target display apparatus illustrated, for example, in FIG. 5 when an operation attempt signal is received.

Referring to FIG. 8, through the communication unit 220, the target display apparatus 200-2 that has received an operation attempt signal transmits to the peripheral display apparatus which shares pairing information, for example, the first display apparatus 200-1, a request message requesting a determination of whether the operation command is received.

When the power supply 210 of the first display apparatus 200-1 is on, the communication unit 220 of the first display apparatus 200-1 may transmit a response message to the request message to the target display apparatus 200-2. The communication unit 220 of the first display apparatus 200-1 may transmit the response message which informs the target display apparatus 200-2 of 'receipt of the operation command.'

The controller 230 of the target display apparatus 200-2 is configured to identify the target control device 100-1 based on the response message of the peripheral display apparatus, for example, the first display apparatus 200-1, and changes a priority of identification information of the target control device 100-1 to the highest priority in an identification information list. The identification information list renewed or revised based on the changing of the priority may be stored in the storage unit 240 of the target display apparatus 200-2.

FIG. 9 is a view illustrating a renewed or revised identification information list of a target display apparatus.

The controller 230 of the target display apparatus 200-2 may be configured to confirm that a target control device is the first control device 100-1 paired with the first display apparatus based on the response message of the first display apparatus 200-1. Once the target control device is identified, the controller 230 changes a BD_ADDR of the first control device 100-1 paired with the first display apparatus 200-1 to the highest priority in an identification information list based on pairing information stored in the storage unit 240, and as illustrated in FIG. 9, the storage unit 240 of the target display apparatus 200-2 stores the identification information list which has the changed priority.

As described above, as the identification information of the target control device 100-1 is changed to the highest priority, the target display apparatus 200-2 may then be controlled by the target control device 100-1. For example, an operation command of the target control device 100-1 is received by the target display apparatus 200-2, and the target display apparatus 200-2 performs a function based on the received operation command.

Figure 10:
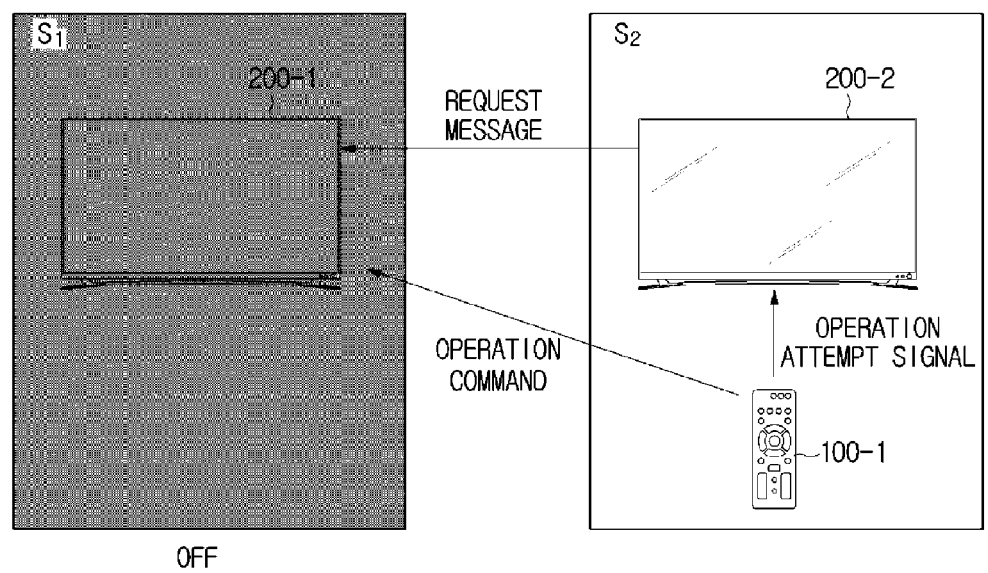
FIG. 10 is a view illustrating an operation of a target display apparatus when a peripheral display apparatus is off.

FIG. 10 is a view illustrating an operation of a target display apparatus when a peripheral display apparatus is off.

Referring to FIG. 10, in a similar manner as illustrated in FIG. 8, through the communication unit 220, the target display apparatus 200-2 that has received an operation attempt signal transmits to a peripheral display apparatus which shares pairing information, for example, the first display apparatus 200-1, a request message requesting determination on whether an operation command is received.

When the power supply 210 of the first display apparatus 200-1 is off, the first display apparatus 200-1 may not transmit a response message to the request message to the target display apparatus 200-2.

When a response message is not received from the peripheral display apparatus, for example, the first display apparatus 200-1, the controller 230 of the target display apparatus 200-2 may be configured to sequentially change a priority of identification information in an identification information list generated in advance. In the identification information list described in FIG. 7B, the controller 230 is configured to change identification information of the second priority, for example, a BD_ADDR of the first control device 100-1, to the first priority.

While the priority of the identification information is sequentially changed, the controller 230 of the target display apparatus 200-2 may be configured to determine whether the operation command is received through the communication unit 220, and when the operation command is received, the controller 230 of the target display apparatus 200-2 may be configured to control the storage such that the identification information list based on the changing of the priority is stored, and may identify the target control device 100-1.

When identification information of a second priority, for example, a BD_ADDR of the first control device 100-1, is changed to the first priority based on a sequential change of the priority of the identification information, the communication unit 220 of the target display apparatus 200-2 may receive the operation command. Thus, the storage unit 240 of the target display apparatus 200-2 stores the identification information list in which the BD_ADDR of the first control device 100-1 is changed to the first priority, for example, the same identification information list as illustrated in FIG. 9. In addition, the controller 230 may be configured to compare the pairing information and the renewed or revised identification information list, determine whether identification information of the first priority is the BD_ADDR of the first control device 100-1, and confirm that the target control device is the first control device 100-1 which was paired with the first display apparatus 200-1.

FIGS. 11 to 19 are views illustrating an operation of a control system of a display apparatus. In FIGS. 11 to 19, a display apparatus 200 and a control device 100 are the same as illustrated in FIG. 2B. For example, FIGS. 11 to 19 illustrate that the display apparatus 200 includes a first display apparatus 200-1 provided in a first space S1, a second display apparatus 200-2 provided in a second space S2, and a third display apparatus 200-3 provided in a third space S3, the first display apparatus 200-1 is paired with a first control device 100-1, the second display apparatus 200-2 is paired with a second control device 100-2, and the third display apparatus 200-3 is paired with a third control device 100-3.

Figure 11:
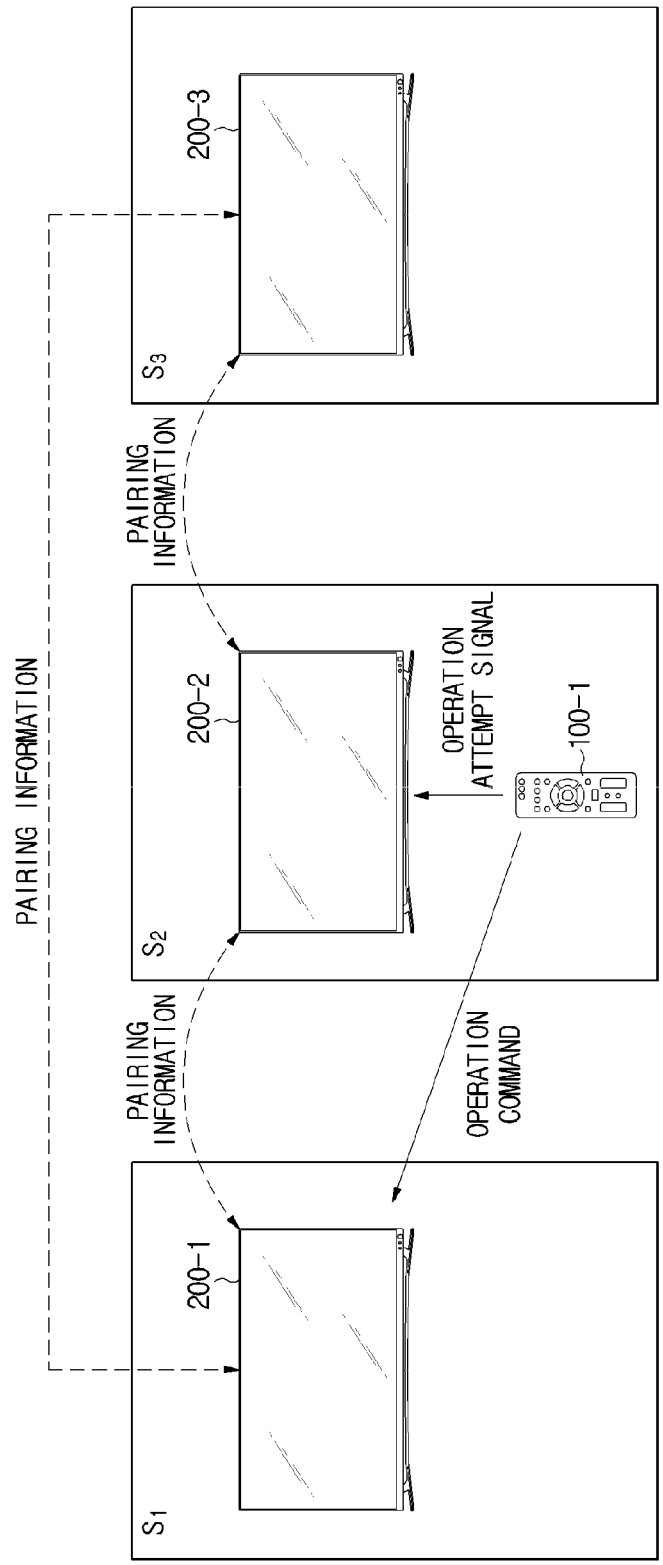
FIG. 11 is a view illustrating another example in which a control device which is paired with a peripheral display apparatus becomes a target control device.

FIG. 11 illustrates another example in which a control device which is paired with a peripheral display apparatus becomes a target control device, FIG. 12 illustrates pairing information stored in the display apparatus in FIG. 11, and FIG. 13 illustrates an identification information list stored in the display apparatus in FIG. 11.

In FIG. 11, for example, the first control device 100-1 which is paired with the first display apparatus 200-1 is located in the same area as the second display apparatus 200-2, and is operated by a user to control the second display apparatus 200-2. For example, the second display apparatus 200-2 becomes a display apparatus to be controlled, for example, a target display apparatus, and the first control device 100-1 paired with the first display apparatus 200-1 becomes a target control device to be controlled by the user.

The first display apparatus 200-1 may search for a different display apparatus located in a certain area, for example, the second display apparatus 200-2 and the third display apparatus 200-3, through the communication unit 220, and transmit, receive, and share pairing information with the located second display apparatus 200-2 and third display apparatus 200-3. Otherwise, the second display apparatus 200-2 may search for a different display apparatus located in a certain area, for example, the first display apparatus 200-1 and the third display apparatus 200-3, through the communication unit 220, and transmit, receive, and share pairing information with the located first display apparatus 200-1 and third display apparatus 200-3. Similarly, the third display apparatus 200-3 may also search for a different display apparatus located in a certain area, for example, the first display apparatus 200-1 and the second display apparatus 200-2, through the communication unit 220, and transmit, receive, and share pairing information with the located first display apparatus 200-1 and second display apparatus 200-2.

Sharing of pairing information among the first display apparatus 200-1, the second display apparatus 200-2, and the third display apparatus 200-3 may be performed before an operation of the target control device 100-1, and the pairing information may be stored in each of the first display apparatus 200-1, the second display apparatus 200-2, and the third display apparatus 200-3.

The pairing information may include identification information of the first control device 100-1 paired with the first display apparatus 200-1, identification information of the second control device 100-2 paired with the second display apparatus 200-2, and identification information of the third control device 100-3 paired with the third display apparatus 200-3.

Thus, when the control device 100 and the display apparatus 200 perform wireless communication, for example, a Bluetooth method, the storage unit 240 of the first display apparatus 200-1, the storage unit 240 of the second display apparatus 200-2, and the storage unit 240 of the third display apparatus 200-3 may each store pairing information as illustrated, for example, in FIG. 12.

For example, the storage unit 240 of the first display apparatus 200-1 may store a BD_ADDR of the first control device 100-1 paired with the first display apparatus 200-1 corresponding to the first display apparatus 200-1, a BD_ADDR of the second control device 100-2 paired with the second display apparatus 200-2 corresponding to the second display apparatus 200-2, and a BD_ADDR of the third control device 100-3 paired with the third display apparatus 200-3 corresponding to the third display apparatus 200-3. Similarly, the storage unit 240 of the second display apparatus 200-2 and the storage unit 240 of the third display apparatus 200-3 may each store the BD_ADDR of the first control device 100-1 paired with the first display apparatus 200-1 corresponding to the first display apparatus 200-1, the BD_ADDR of the second control device 100-2 paired with the second display apparatus 200-2 corresponding to the second display apparatus 200-2, and the BD_ADDR of the third control device 100-3 paired with the third display apparatus 200-3 corresponding to the third display apparatus 200-3.

The first display apparatus 200-1, the second display apparatus 200-2, and the third display apparatus 200-3 may each generate and store an identification information list of the control device 100 based on pairing information.

The controller 230 of the first display apparatus 200-1 may be configured to generate an identification information list based on pairing information so that a control priority of the first control device 100-1 paired with the first display apparatus 200-1 becomes the highest priority, and the generated identification information list may be stored in the storage unit 240. For example, as illustrated in FIG. 13A, the storage unit 240 of the first display apparatus 200-1 may store the identification information list in which a BD_ADDR of the first control device 100-1 has the first priority.

In addition, the controller 230 of the second display apparatus 200-2 may be configured to generate an identification information list based on pairing information so that a control priority of second control device 100-2 paired with the second display apparatus 200-2 becomes the highest priority, and the generated identification information list may be stored in the storage unit 240. For example, as illustrated in FIG. 13B, the storage unit 240 of the second display apparatus 200-2 may store the identification information list in which a BD_ADDR of the second control device 100-2 has the first priority.

Similarly, the controller 230 of the third display apparatus 200-3 may be configured to generate an identification information list based on pairing information so that a control priority of third control device 100-3 paired with the third display apparatus 200-3 becomes the highest priority, and the generated identification information list may be stored in the storage unit 240. For example, as illustrated in FIG. 13C, the storage unit 240 of the third display apparatus 200-3 may store the identification information list in which a BD_ADDR of the third control device 100-3 has the first priority.

Referring to FIG. 11, when a user command is input through the input unit 150 of the target control device 100-1, the communication unit 120 of the target control device 100-1 transmits an operation attempt signal to a target display apparatus located in the same area, for example, the second display apparatus 200-2, and transmits an operation command to the first display apparatus 200-1 paired with the target control device 100-1.

FIG. 14 illustrates an operation of a target display apparatus according to FIG. 11 when an operation attempt signal is received.

Referring to FIG. 14, through the communication unit 220, the target display apparatus 200-2 which received the operation attempt signal transmits to a peripheral display apparatus, for example, the first display apparatus 200-1 and the third display apparatus 200-3 which share pairing information, a request message requesting a determination of whether an operation command is received.

When the power supply 210 of the first display apparatus 200-1 is on, the communication unit 220 of the first display apparatus 200-1 may transmit a response message to the request message to the target display apparatus 200-2. The communication unit 220 of the first display apparatus 200-1 may transmit the response message which informs the target display apparatus 200-2 of 'receipt of the operation command.'

In addition, when the power supply 210 of the third display apparatus 200-3 is on, the communication unit 220 of the third display apparatus 200-3 may transmit a response message to the request message to the target display apparatus 200-2. The communication unit 220 of the third display apparatus 200-3 may transmit the response message which informs the target display apparatus 200-2 of 'no receipt of the operation command.'

The controller 230 of the target display apparatus 200-2 is configured to identify the target control device 100-1 based on the response messages of the peripheral display apparatus, for example, the first display apparatus 200-1 and the third display apparatus 200-3, and to change a priority of identification information of the target control device 100-1 to the highest priority in an identification information list. The identification information list renewed or revised based on the changing of the priority may be stored in the storage unit 240 of the target display apparatus 200-2.

FIG. 15 is a view illustrating a renewed or revised identification information list of a target display apparatus.

The controller 230 of the target display apparatus 200-2 may be configured to confirm that a display apparatus which received the operation command is the first display apparatus 200-1 based on the response message of the first display apparatus 200-1 and the third display apparatus 200-3. For example, the controller 230 may be configured to determine that a target control device is the first control device 100-1 paired with the first display apparatus.

Once the target control device is identified, the controller 230 may be configured to change a BD_ADDR of the first control device 100-1 paired with the first display apparatus 200-1 to the highest priority in an identification information list based on the pairing information stored in the storage unit 240, and as illustrated in FIG. 15, the storage unit 240 of the target display apparatus 200-2 may store the identification information list having the changed priority.

As described above, as the identification information of the target control device 100-1 is changed to the highest priority, the target display apparatus 200-2 may be controlled by the target control device 100-1. For example, the operation command of the target control device 100-1 is received by the target display apparatus 200-2, and the target display apparatus 200-2 performs a function based on the received operation command.

Figure 16:
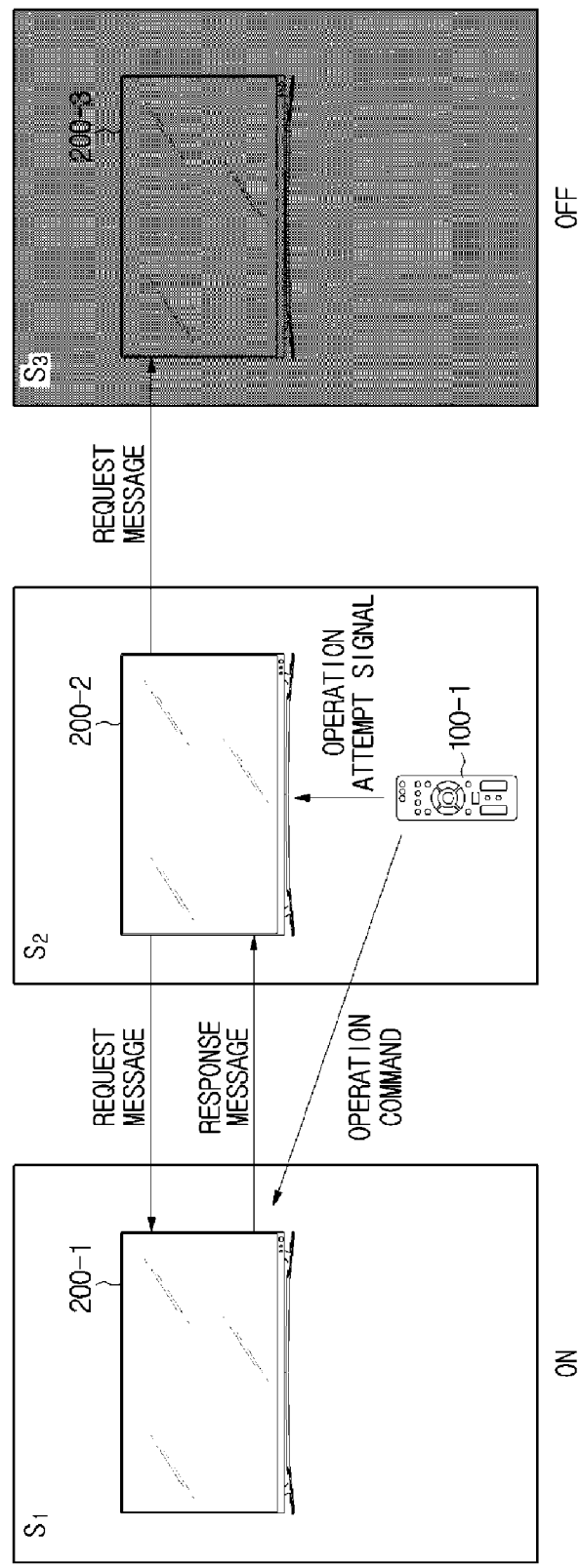
FIGS. 16 and 17 are views illustrating an operation of a target display apparatus when a part of the peripheral display apparatuses is off.
Figure 17:
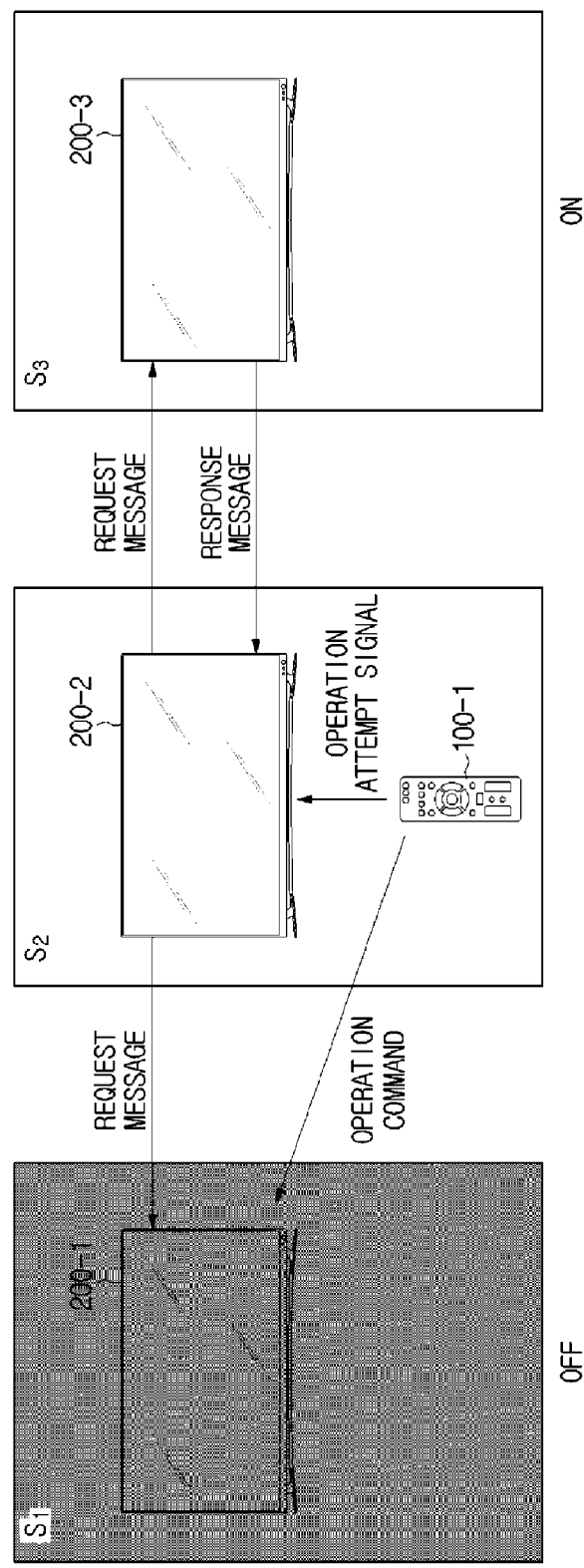

FIGS. 16 and 17 are views illustrating an operation of a target display apparatus when a peripheral display apparatus is off.

Referring to FIGS. 16 and 17, in a similar manner as described above with reference to FIG. 14, through the communication unit 220, the target display apparatus 200-2 that has received an operation attempt signal transmits to peripheral display apparatuses which share pairing information, for example, the first display apparatus 200-1 and the third display apparatus 200-3, a request message requesting determination on whether an operation command is received.

As illustrated in FIG. 16, when the power supply 210 of the first display apparatus 200-1 is on, the communication unit 220 of the first display apparatus 200-1 may transmit a response message to the request message to the target display apparatus 200-2. However, when the power supply 210 of the third display apparatus 200-3 is off, the communication unit 220 of the third display apparatus 200-3 may not transmit the response message to the request message to the target display apparatus 200-2.

For example, the communication unit 220 of the target display apparatus 200-2 receives the response message which informs of 'receipt of the operation command' from the first display apparatus 200-1, but does not receive the response message from the third display apparatus 200-3.

The controller 230 of the target display apparatus 200-2 may be configured to determine that a display apparatus that has received the operation command is the first display apparatus 200-1 based on the response message of the first display apparatus 200-1, and a target control device is the first control device 100-1 paired with the first display apparatus.

As illustrated in FIG. 17, when the power supply 210 of the first display apparatus 200-1 is off, the communication unit 220 of the first display apparatus 200-1 may not transmit a response message to the request message to the target display apparatus 200-2. However, when the third display apparatus 200-3 is on, the communication unit 220 of the third display apparatus 200-3 may transmit a response message to the request message to the target display apparatus 200-2.

For example, the communication unit 220 of the target display apparatus 200-2 does not receive a response message from the first display apparatus 200-1, but receives a response message which informs of 'no receipt of the operation command' from the third display apparatus 200-3.

The controller 230 of the target display apparatus 200-2 may be configured to confirm that the third display apparatus 200-3 does not receive the operation command, for example, a display apparatus that has received the operation command is the first display apparatus 200-1, based on the response message of the third display apparatus 200-3, and that the target control device is the first control device 100-1 paired with first display apparatus.

Once the target control device is identified, the controller 230 may be configured to change a BD_ADDR of the first control device 100-1 paired with the first display apparatus 200-1 to the highest priority in an identification information list based on the pairing information stored in the storage unit 240. Thus, the target display apparatus 200-2 may be controlled by the target control device 100-1.

Figure 18:
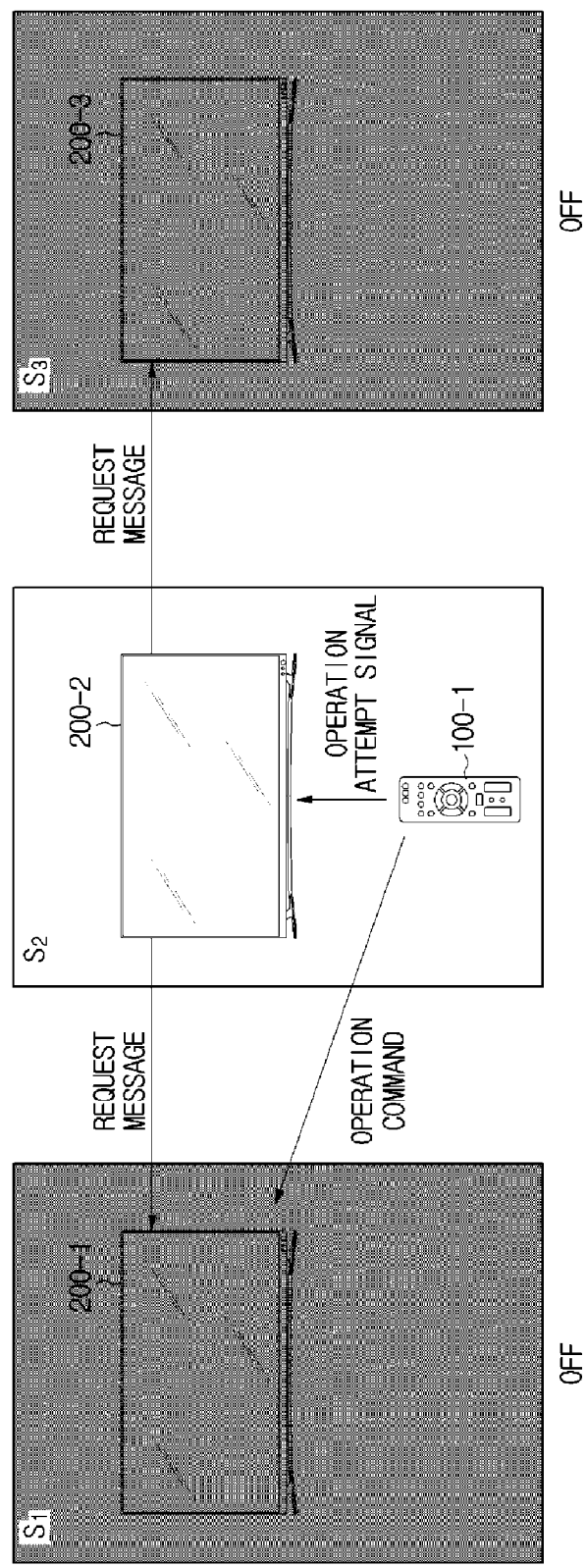
FIG. 18 is a view illustrating an operation of a target display apparatus when all peripheral display apparatuses are off.

FIG. 18 is a view illustrating an operation of a target display apparatus when all peripheral display apparatuses are off, and FIG. 19 is a view illustrating a sequential change of priorities of a number of identification information.

As illustrated in FIG. 18, when all of the power supplies 210 of peripheral display apparatuses 200-1 and 200-3 are off, the communication unit 220 of the target display apparatus 200-2 does not receive a response message from the peripheral display apparatuses 200-1 and 200-3.

When the response message is not received from the peripheral display apparatuses 200-1 and 200-3 in a certain period, the controller 230 of the target display apparatus 200-2 may be configured to sequentially change a priority of identification information in an identification information list which was generated in advance. While the priority of the identification information is changed sequentially, the controller 230 of the target display apparatus 200-2 may be configured to determine through the communication unit 220 whether an operation command is received, and when the operation command is received, the controller 230 of the target display apparatus 200-2 is configured to control the storage such that the identification information list based on the changed priority is stored.

In the identification information list illustrated in FIG. 19A, the controller 230 changes an identification information of the second priority, for example, a BD_ADDR of the third control device 100-3, to the first priority, and renews or revises the identification information list as illustrated in FIG. 19A. When the BD_ADDR of the third control device 100-3 is changed to the first priority, the communication unit 220 of the target display apparatus 200-2 is still unable to receive the operation command, and the controller 230 is configured to change the priority again.

The controller 230 is configured to change identification information of the second priority in the renewed identification information list, for example, a BD_ADDR of the first control device 100-1, to the first priority, and renews or revises the identification information list as illustrate in FIG. 19B. When the BD_ADDR of the first control device 100-1 is changed to the first priority, the communication unit 220 of the target display apparatus 200-2 may receive the operation command. Thus, the storage unit 240 of the target display apparatus 200-2 may store the identification information list in which the BD_ADDR of the first control device 100-1 is changed to the first priority, for example, the renewed identification information list as illustrated in FIG. 19B, and the controller 230 may be configured to compare pairing information and the renewed identification information list, confirm that the identification information of the first priority is the BD_ADDR of the first control device 100-1, and identify that the target control device is the paired first control device 100-1 paired with the first display apparatus 200-1.

The display apparatus 200, the control device 100, and the control system 1 of the display apparatus including the same were described above, and a control method of a display apparatus will be described hereinafter with reference to an accompanying flow chart.

Figure 20:
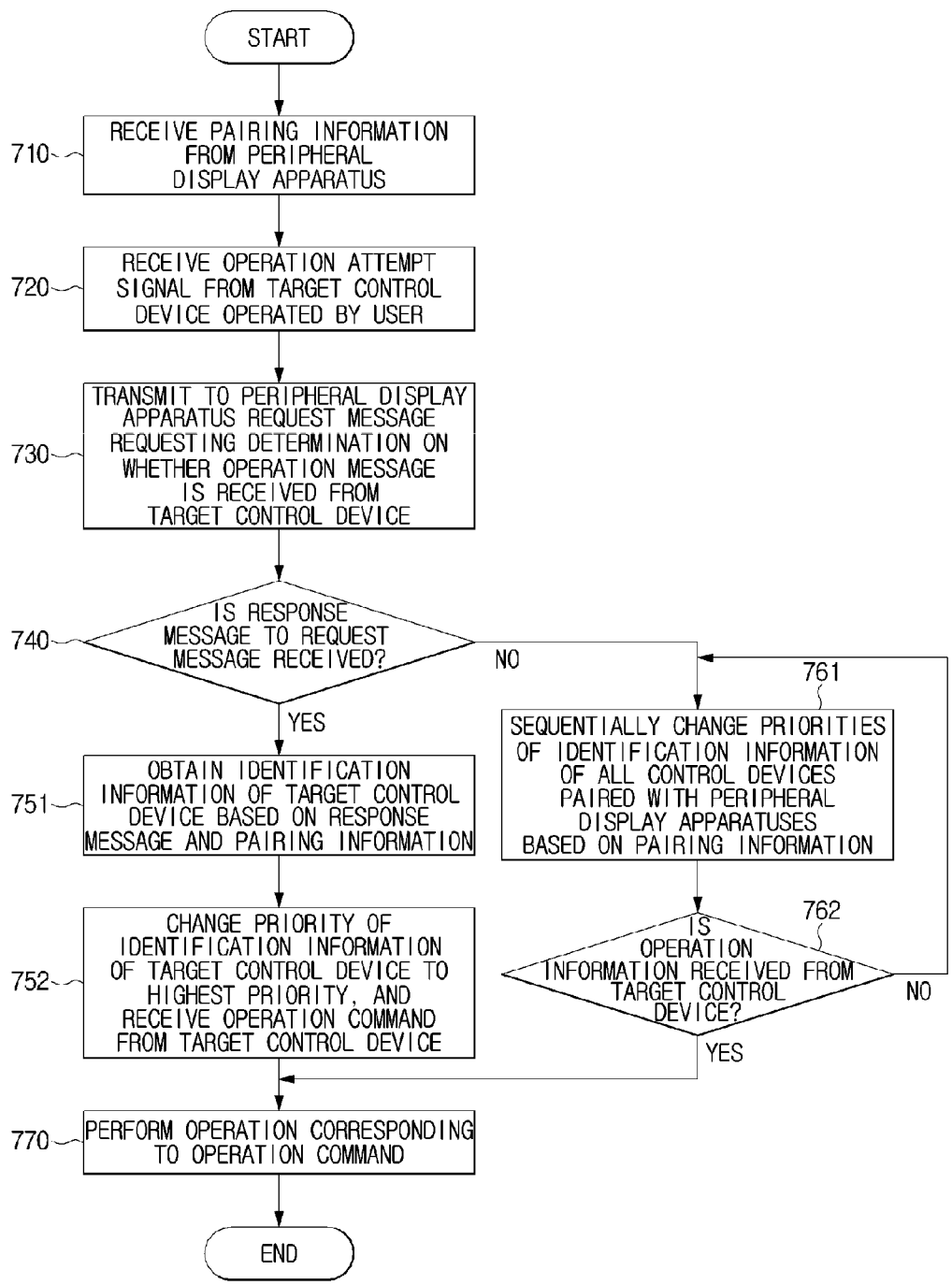
FIG. 20 is a flow chart illustrating a control method of a display apparatus.

FIG. 20 is a flow chart illustrating a control method of a display apparatus.

Referring to FIG. 20, the target display apparatus 200 receives pairing information from the peripheral display apparatuses 200, or shares the pairing information with the peripheral display apparatuses 200 (S710).

Sharing of pairing information with the peripheral display apparatuses 200 is performed before an operation of the target control device 100-1, and the pairing information is stored in the target display apparatus 200. In addition, the target display apparatus 200 generates an identification information list for the control devices 100 based on the pairing information, and stores the generated identification information list.

When the target control device is controlled by a user, the target display apparatus 200 receives an operation attempt signal from the target control device 100 (S720).

The target display apparatus 200-2 that has received the operation attempt signal transmits to the peripheral display apparatuses which share the pairing information a request message requesting a determination of whether an operation command is received (S730). Next, the target display apparatus 200-2 determines whether response messages to the request message are received from the peripheral display apparatuses 200 (S740).

When the response messages are received, the target display apparatus 200 obtains identification information of the target control device 100 based on the response messages and the pairing information (S751).

The target display apparatus 200 identifies what display apparatus 200 was paired with the target control device 100 based on the response messages, and obtains the identification information of the target control device 100 based on the pairing information.

The target display apparatus 200 then changes a priority of the identification information of the target control device 100 in the identification information list to the highest priority (S752). As the identification information of the target control device 100 is changed to the highest priority, the operation command of the target control device 100 is received by the target display apparatus 200. In addition, the identification information list which has the changed priority may be stored in the target display apparatus 200.

The target display apparatus 200 performs a function or an operation corresponding to the received operation command (S770). For example, the target display apparatus 200 may be controlled by the target control device 100.

In the determination of S740, when the response messages are not received, the target display apparatus 200 sequentially changes the priority of the identification information of the control devices 100 paired with the peripheral display apparatuses 200 based on the pairing information (S761). For example, the target display apparatus 200 sequentially changes the priority of the identification information in the identification information list generated based on the pairing information, and renews the identification information list.

While the priority of the identification information is changed sequentially, the target display apparatus 200 determines whether the operation command is received (S762).

When the operation command is not received, the process returns to S761. For example, the target display apparatus 200 performs the priority change of the identification information again and renews the identification information list again.

When the operation command is received, the target display apparatus 200 performs a function or an operation corresponding to the received operation command (S770). The target display apparatus 200 may store the identification information list based on the changed priority, compare the pairing information and the renewed identification information list, and identify the target control device 100.

As is apparent from the above description, in a display apparatus and a control system and method for the same in accordance with example embodiments, the display apparatus can be controlled through a control device paired with a different display apparatus, and since a re-pairing process is not performed by a user, an additional operation in which a user performs a re-pairing process can be removed, and the convenience of the user can be improved.

As described above, and will be appreciated by those skilled in the art, the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium.

While embodiments of the display apparatus, and the control system and control method for the same have been described above with reference to the drawings, it will be understood by those skilled in the art that the examples may be performed in other concrete forms without changing the technological scope and essential features. Therefore, the aforementioned embodiments should be considered only as examples in all aspects and not for purposes of limitation.

What is claimed is:

1. A display apparatus configured to perform wireless communication with a target control device and a peripheral display apparatus, the display apparatus comprising:
   communication circuitry configured to transmit to the peripheral display apparatus a request message requesting a determination of whether an operation command of the target control device is received when the target control device is operated; and
   a controller configured to perform a function corresponding to the operation command of the target control device based on a response message to the request message.

2. The display apparatus of claim 1, wherein the target control device is one of control devices paired with the peripheral display apparatus.

3. The display apparatus of claim 1, wherein the operation command includes Bluetooth data corresponding to the operation command.

4. The display apparatus of claim 2, wherein, in response to the target control device being operated, the communication circuitry receives an operation attempt signal of the target control device, and when the operation attempt signal is received, the communication circuitry transmits the request message.

5. The display apparatus of claim 4, wherein the operation attempt signal includes an infrared (IR) signal.

6. The display apparatus of claim 2, wherein the communication circuitry receives pairing information of the peripheral display apparatus.

7. The display apparatus of claim 6, wherein the pairing information includes identification information of each control device paired with the peripheral display apparatus.

8. The display apparatus of claim 7, wherein the identification information includes a Bluetooth device address (BD_ADDR).

9. The display apparatus of claim 7, wherein, in response to the communication circuitry receives the response message from the peripheral display apparatus, the controller is configured to change a priority of identification information of the target control device in the identification information to a highest priority based on the response message and the pairing information.

10. The display apparatus of claim 7, wherein, in response to the communication circuitry not receiving the response message from the peripheral display apparatus, the controller is configured to sequentially change priorities of a number of the identification information based on the pairing information.

11. The display apparatus of claim 9, wherein the communication circuitry receives an operation command of the target control device based on the changing of the priority.

12. The display apparatus of claim 11, wherein, when the operation command is received, the controller is configured to perform a function corresponding to the operation command.

13. A control system for a display apparatus comprising:
a target control device; and
a display apparatus configured to perform wireless communication with the target control device and a peripheral display apparatus,
wherein the display apparatus includes:
communication circuitry configured to transmit to the peripheral display apparatus a request message requesting a determination of whether an operation command of the target control device is received when the target control device is operated; and
a controller configured to perform a function corresponding to the operation command of the target control device based on a response message to the request message.

14. The control system of claim 13, wherein the target control device is one of control devices paired with the peripheral display apparatus.

15. The control system of claim 14, wherein, in response to the target control device being operated, the communication circuitry receives an operation attempt signal of the target control device, and in response to the operation attempt signal being received, the communication circuitry transmits the request message.

16. The control system of claim 14, wherein the communication circuitry receives pairing information of the peripheral display apparatus.

17. The control system of claim 16, wherein the pairing information includes identification information of each control device paired with the peripheral display apparatus.

18. The control system of claim 17, wherein, in response to the communication circuitry receiving the response message from the peripheral display apparatus, the controller is configured to change a priority of identification information of the target control device in the identification information to a highest priority based on the response message and the pairing information.

19. The control system of claim 17, wherein, in response to the communication circuitry not receiving the response message from the peripheral display apparatus, the controller is configured to sequentially change priorities of a number of the identification information based on the pairing information.

20. The control system of claim 18, wherein the communication circuitry is configured to receive an operation command of the target control device based on the changing of the priority.

21. The control system of claim 20, wherein, in response to the operation command being received, the controller is configured to perform a function corresponding to the operation command.

22. A method of controlling a display apparatus which is configured to perform wireless communication with a target control device and a peripheral display apparatus, comprising:
transmitting to the peripheral display apparatus a request message requesting a determination of whether an operation command of the target control device is received when the target control device is operated; and
performing a function corresponding to the operation command of the target control device based on a response message to the request message.

23. The method of claim 22, wherein the target control device is one of control devices paired with the peripheral display apparatus.

24. The method of claim 23, wherein transmitting the request message to the peripheral display apparatus includes:
receiving an operation attempt signal of the target control device when the target control device is operated; and
transmitting the request message when the operation attempt signal is received.

25. The method of claim 23, further comprising receiving pairing information of the peripheral display apparatus.

26. The method of claim 25, wherein the pairing information includes identification information of each control device paired with the peripheral display apparatus.

27. The method of claim 26, further comprising, when the response message is received from the peripheral display apparatus, changing a priority of identification information of the target control device in the identification information to a highest priority based on the response message and the pairing information.

28. The method of claim 26, further comprising, when the response message is not received from the peripheral display apparatus, sequentially changing priorities of a number of the identification information based on the pairing information.

29. The method of claim 27, wherein the control such that the function corresponding to the operation command is performed includes receiving the operation command of the target control device based on the changing of the priority, and performing control such that a function corresponding to the operation command is performed when the operation command is received.

* * * * *